US011394940B1

(12) United States Patent
Martin et al.

(10) Patent No.: US 11,394,940 B1
(45) Date of Patent: Jul. 19, 2022

(54) DYNAMIC IMAGE WARPING

(71) Applicant: TEXAS INSTRUMENTS INCORPORATED, Dallas, TX (US)

(72) Inventors: Samuel Edward Martin, Dallas, TX (US); Jackson Grant Schleich, Lavon, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 17/232,873

(22) Filed: Apr. 16, 2021

(51) Int. Cl.
| | |
|---|---|
| *H04N 9/31* | (2006.01) |
| *G06F 3/01* | (2006.01) |
| *H04N 17/00* | (2006.01) |
| *H04N 13/349* | (2018.01) |
| *H04N 13/366* | (2018.01) |
| *H04N 13/327* | (2018.01) |

(52) U.S. Cl.
CPC ........... *H04N 9/3185* (2013.01); *G06F 3/013* (2013.01); *H04N 9/3147* (2013.01); *H04N 9/3194* (2013.01); *H04N 17/004* (2013.01)

(58) Field of Classification Search
CPC .. H04N 9/3185; H04N 9/3147; H04N 9/3194; H04N 17/004; H04N 13/32; H04N 13/302; H04N 13/349; H04N 13/366; H04N 13/368; G06F 3/013
See application file for complete search history.

(56) References Cited

U.S. PATENT DOCUMENTS

| | | | | |
|---|---|---|---|---|
| 6,456,339 | B1 * | 9/2002 | Surati | G03B 37/04 |
| | | | | 348/744 |
| 6,592,228 | B1 * | 7/2003 | Kawashima | G03B 21/11 |
| | | | | 348/745 |
| 7,705,862 | B1 * | 4/2010 | Teng | G09G 3/002 |
| | | | | 345/647 |
| 8,297,757 | B2 * | 10/2012 | Kubota | G03B 21/14 |
| | | | | 353/70 |
| 8,406,562 | B2 * | 3/2013 | Bassi | H04N 9/3194 |
| | | | | 382/275 |
| 8,567,953 | B2 * | 10/2013 | O'Dor | H04N 13/337 |
| | | | | 353/7 |
| 8,708,513 | B2 * | 4/2014 | Schrimmer | F21S 4/10 |
| | | | | 362/102 |
| 8,992,050 | B1 * | 3/2015 | Yuan | H04N 13/25 |
| | | | | 362/293 |
| 9,134,594 | B2 * | 9/2015 | Kim | H04N 9/3144 |
| 9,264,679 | B2 * | 2/2016 | Tickoo | H04N 9/3176 |
| 9,489,724 | B2 * | 11/2016 | Davies | H04N 13/363 |
| 10,306,195 | B2 * | 5/2019 | Saigo | G06T 3/005 |
| 10,362,284 | B2 * | 7/2019 | Thompson | H04N 9/3185 |

(Continued)

*Primary Examiner* — Brian P Yenke
(74) *Attorney, Agent, or Firm* — Michelle F. Murray; Charles A. Brill; Frank D. Cimino

(57) ABSTRACT

A system includes a first projector and a second projector offset from the first projector. The system includes a rail and a controller coupled to the first projector and to the second projector. The controller is configured to move the first projector and the second projector along the rail. The controller is also configured to apply a first warping correction to a first image projected by the first projector, based at least in part on a position of the first projector. The controller is further configured to apply a second warping correction to a second image projected by the second projector, based at least in part on a position of the second projector.

21 Claims, 17 Drawing Sheets

(56) References Cited

U.S. PATENT DOCUMENTS

| | | | |
|---|---|---|---|
| 10,462,421 B2* | 10/2019 | Rintel | G06F 3/013 |
| 10,593,053 B2* | 3/2020 | Takizawa | G06T 5/006 |
| 10,684,537 B2* | 6/2020 | De La Cruz | G06T 5/006 |
| 10,976,812 B2* | 4/2021 | Ikeda | G09G 5/36 |
| 11,016,560 B1* | 5/2021 | Wenger | H04N 13/332 |
| 11,122,250 B2* | 9/2021 | Ito | H04N 13/167 |
| 2005/0046755 A1* | 3/2005 | Hattori | H04N 5/74 348/837 |
| 2005/0168705 A1* | 8/2005 | Li | H04N 5/74 353/69 |
| 2006/0158425 A1* | 7/2006 | Andrews | G03B 21/145 345/156 |
| 2006/0290897 A1* | 12/2006 | Engle | G03B 21/145 353/70 |
| 2007/0242233 A1* | 10/2007 | Sokeila | H04N 9/3185 353/69 |
| 2007/0273845 A1* | 11/2007 | Birmingham | G03B 21/008 353/101 |
| 2008/0002262 A1* | 1/2008 | Chirieleison | G02B 27/0093 359/630 |
| 2009/0257031 A1* | 10/2009 | Carroll | G03B 21/14 353/30 |
| 2012/0120372 A1* | 5/2012 | Timoner | H04N 9/3147 353/31 |
| 2014/0160341 A1* | 6/2014 | Tickoo | H04N 5/23206 348/333.12 |
| 2015/0146990 A1* | 5/2015 | Uchiyama | G06T 5/006 382/201 |
| 2015/0189267 A1* | 7/2015 | Kaji | H04N 9/3182 348/187 |
| 2015/0229896 A1* | 8/2015 | Grundhofer | H04N 9/3182 348/747 |
| 2015/0281629 A1* | 10/2015 | Davies | H04N 9/3185 348/51 |
| 2018/0007328 A1* | 1/2018 | Kursula | H04N 9/3194 |
| 2019/0132576 A1* | 5/2019 | Zhang | H04N 13/232 |
| 2019/0146313 A1* | 5/2019 | De La Cruz | H04N 9/3194 345/581 |
| 2019/0273915 A1 | 9/2019 | Oberascher et al. | |
| 2020/0082496 A1* | 3/2020 | Chong | G06T 3/005 |
| 2020/0169706 A1* | 5/2020 | Mori | H04N 9/3185 |
| 2020/0273188 A1* | 8/2020 | Hamilton | H04N 19/132 |
| 2020/0293146 A1* | 9/2020 | Ferris | G06F 3/042 |
| 2020/0413032 A1* | 12/2020 | Lyubarsky | H04N 13/361 |
| 2021/0152796 A1* | 5/2021 | Boud | G03B 43/00 |
| 2021/0321081 A1* | 10/2021 | Appelgate | G06T 7/50 |

\* cited by examiner

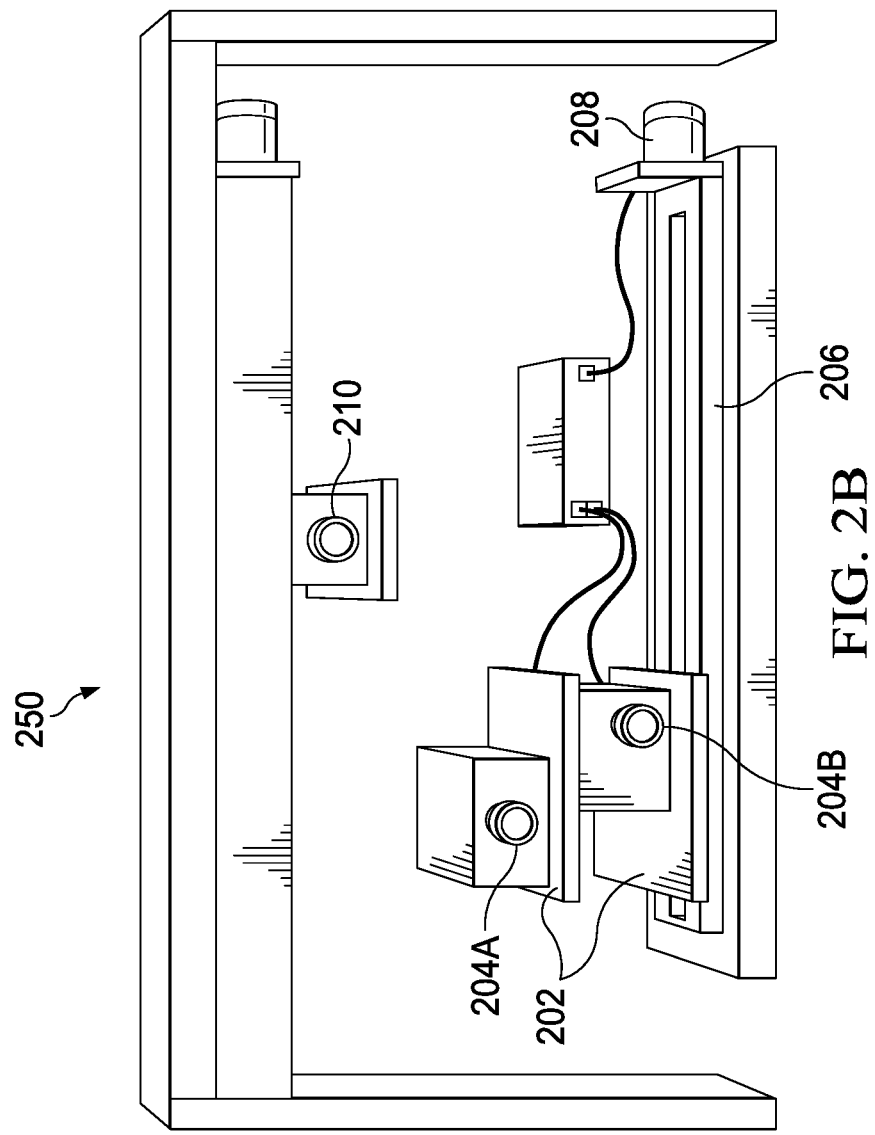

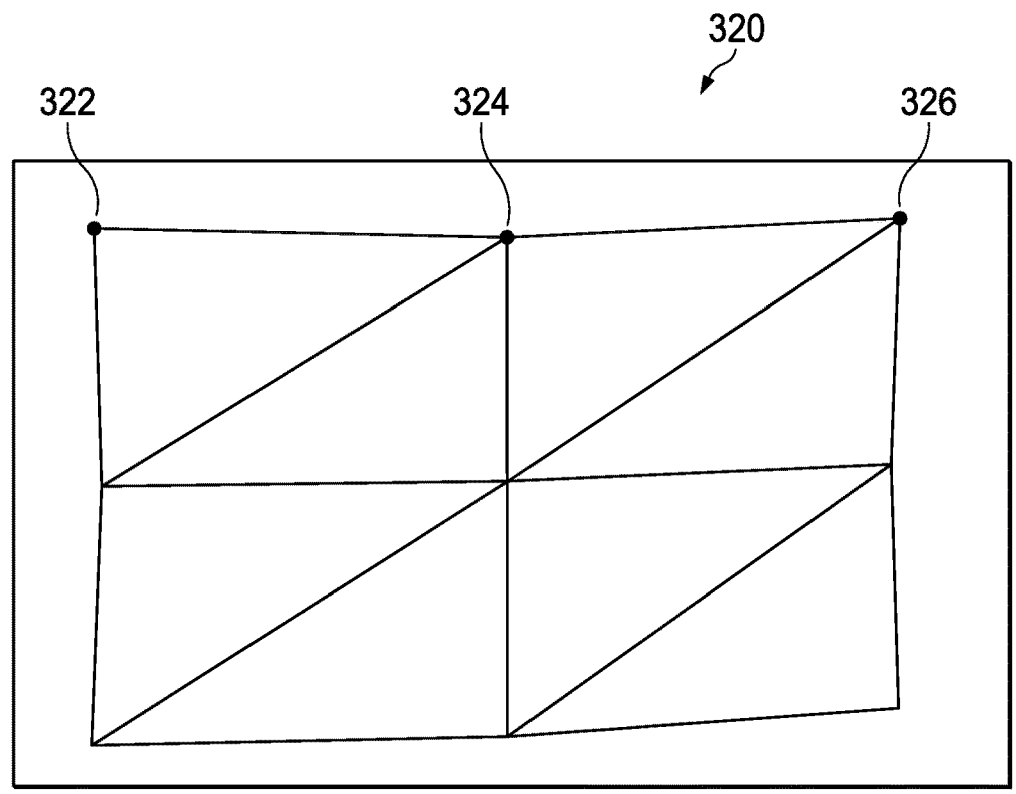
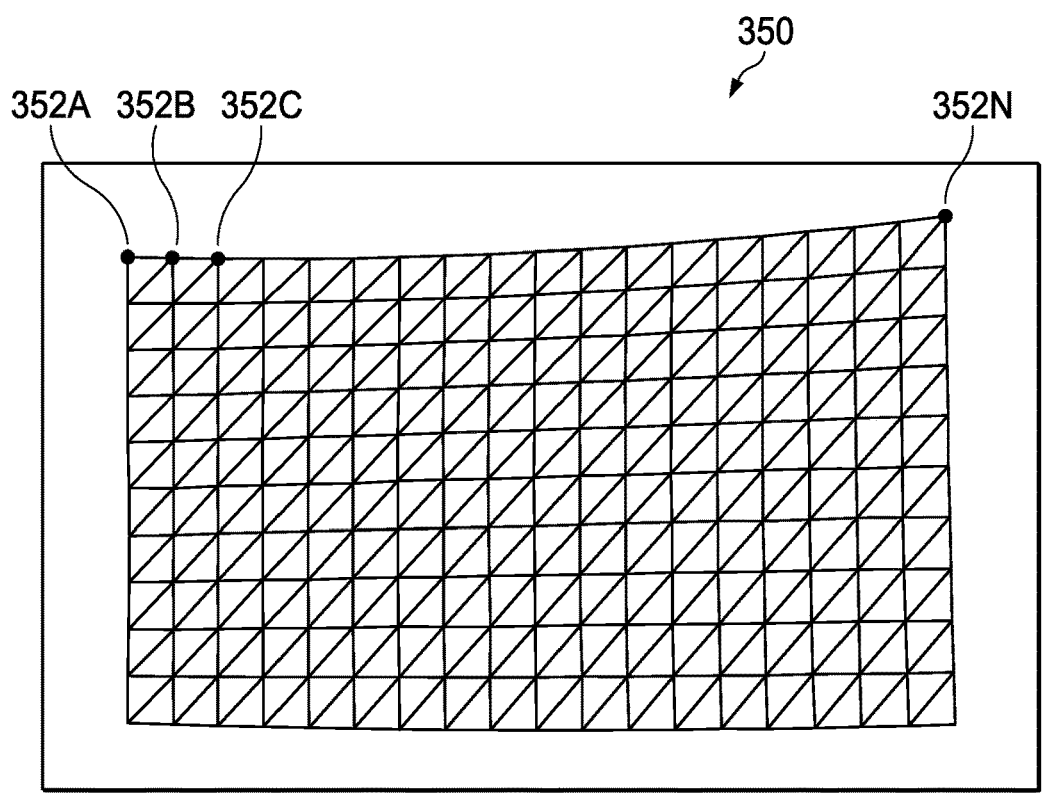
FIG. 3B

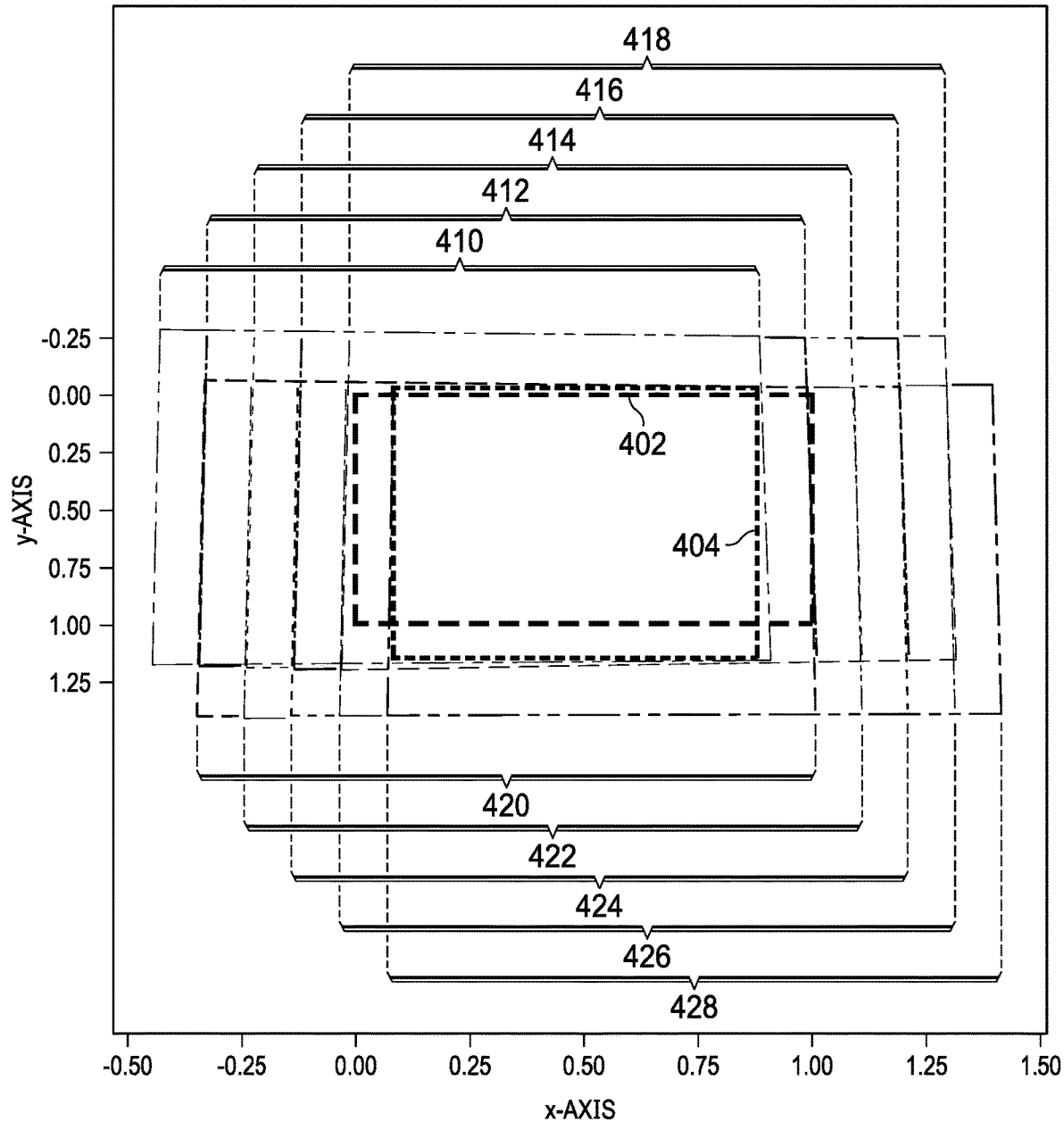

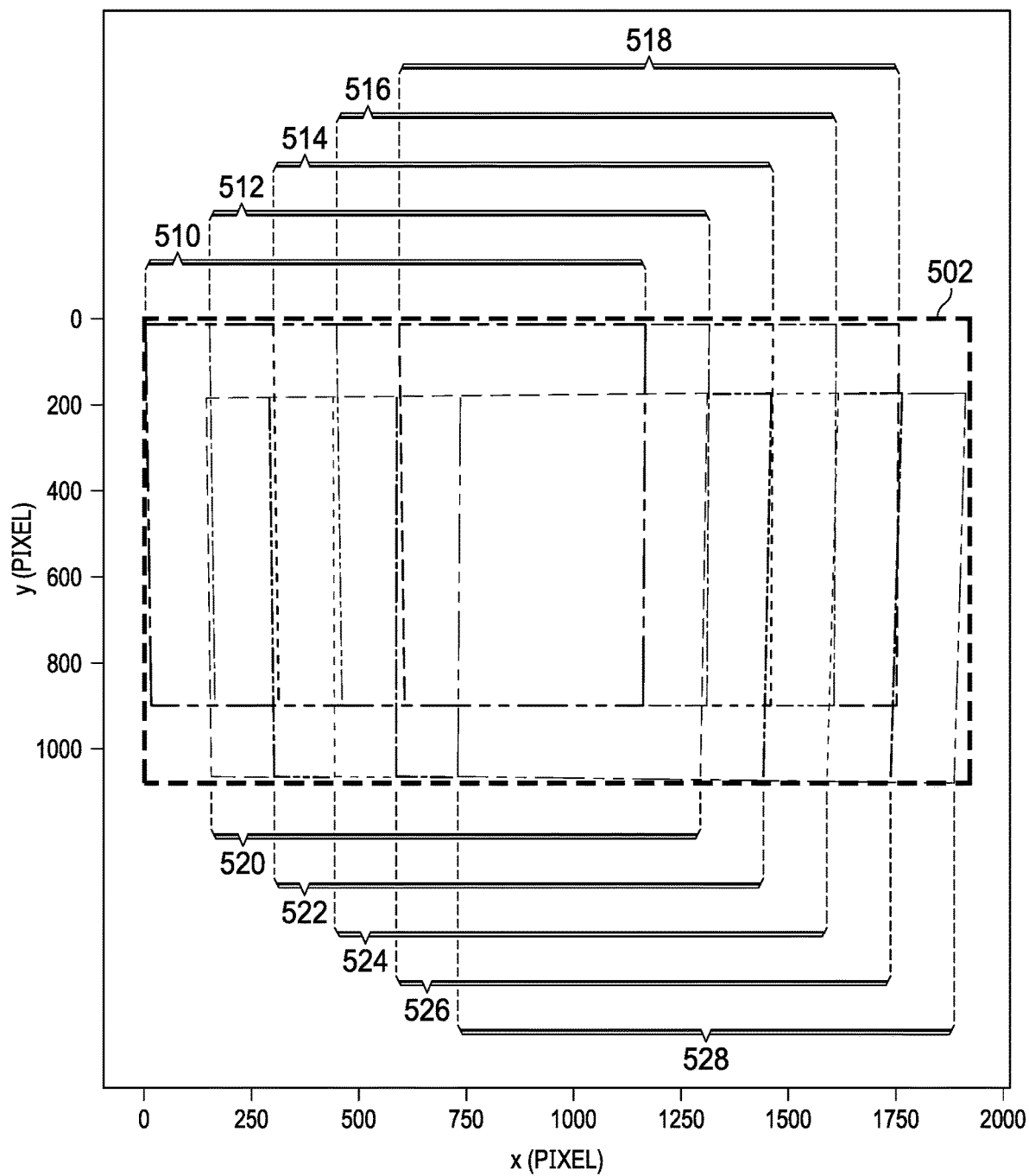

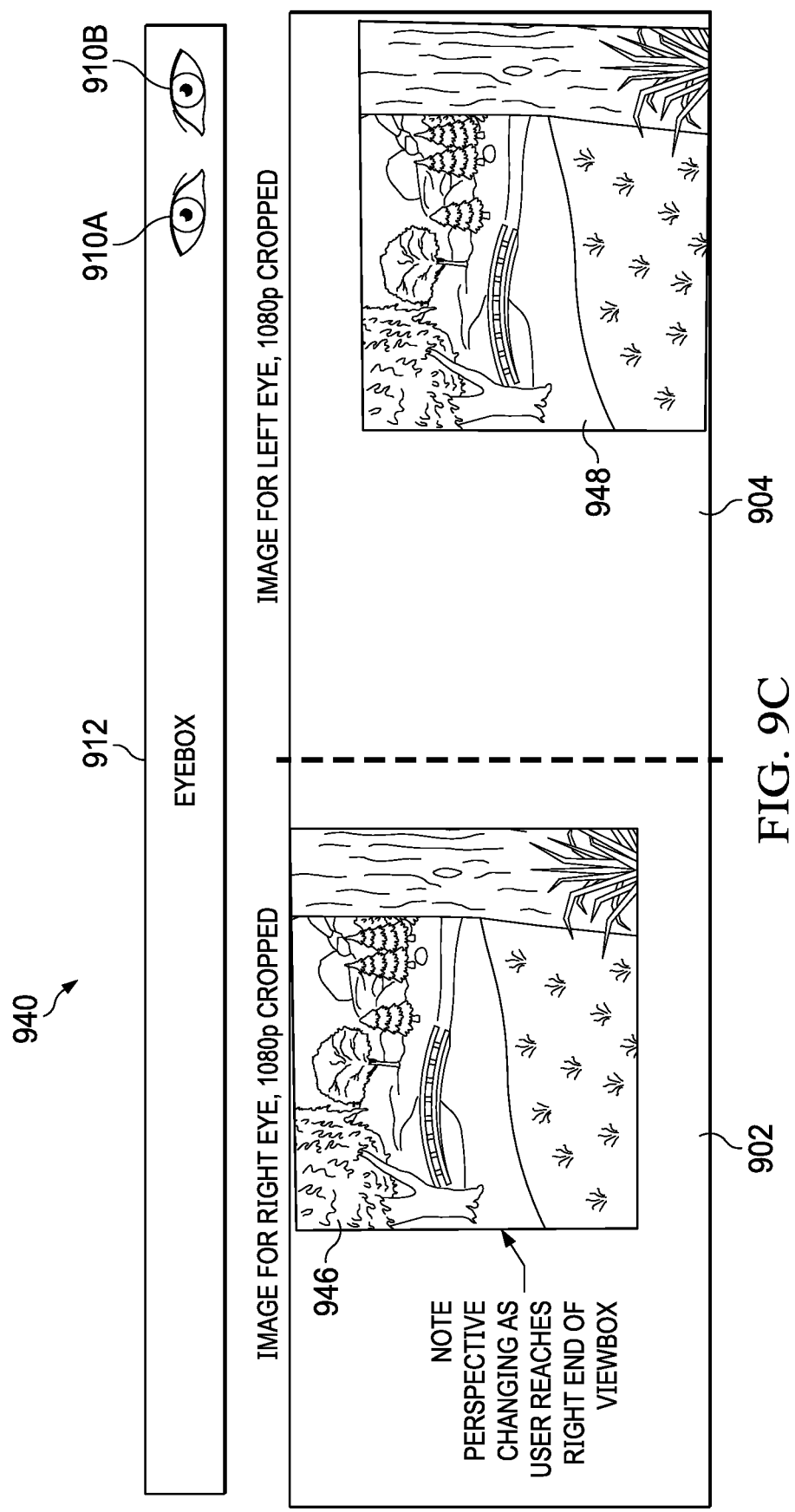

DYNAMIC IMAGE WARPING

BACKGROUND

Some projection systems provide a three-dimensional (3D) experience for a viewer without requiring the use of glasses. The 3D experience is provided by using an array of projectors or a smaller number of projectors that move and follow a viewer's head or eyes.

SUMMARY

In accordance with at least one example of the description, a system includes a projector and a controller coupled to the projector. The controller is configured to obtain a sensor reading indicating user movement. The controller is also configured to move the projector from a first position to a second position based at least in part on the sensor reading. The controller is further configured to select a first warp map and a second warp map based on the second position. The controller is also configured to interpolate between the first warp map and the second warp map to produce a warping correction. The controller is also configured to apply the warping correction to a first image to produce a second image. The projector is configured to project the second image.

In accordance with at least one example of the description, a method includes producing a first warp map with a processor. The first warp map is produced by projecting a test pattern onto a projection surface from a first position. The first warp map is further produced by capturing a first picture of the projected test pattern on the projection surface with a camera. The first warp map is also produced by comparing the first picture with the test pattern, and producing the first warp map for the first position. The method also includes producing a second warp map with the processor, where the second warp map is produced by projecting the test pattern onto the projection surface from a second position. The second warp map is also produced by capturing a second picture of the projected test pattern on the projection surface with the camera. The second warp map is further produced by comparing the second picture with the test pattern, and producing the second warp map for the second position. The method also includes producing a warping correction for an image projected from a projector at a third position, where the warping correction is based at least in part on the first warp map and the second warp map.

In accordance with at least one example of the description, a system includes a first projector and a second projector offset from the first projector. The system includes a rail and a controller coupled to the first projector and to the second projector. The controller is configured to move the first projector and the second projector along the rail. The controller is also configured to apply a first warping correction to a first image projected by the first projector, based at least in part on a position of the first projector. The controller is further configured to apply a second warping correction to a second image projected by the second projector, based at least in part on a position of the second projector.

BRIEF DESCRIPTION OF THE DRAWINGS

For a detailed description of various examples, reference will now be made to the accompanying drawings in which:

FIG. 2B is a front view of a projection rig for providing a 3D-viewing experience with multiple projectors in accordance with various examples.

FIG. 3B is a diagram of warp maps in accordance with various examples.

FIG. 4 is a graph of images from two projectors at different horizontal positions along a rail in accordance with various examples.

FIG. 5 is a graph of the largest visible rectangle mapped to projector pixel coordinates in accordance with various examples.

FIG. 9C is a diagram of images mapped in projector space for a two-projector system in accordance with various examples.

DETAILED DESCRIPTION

Figure 1:
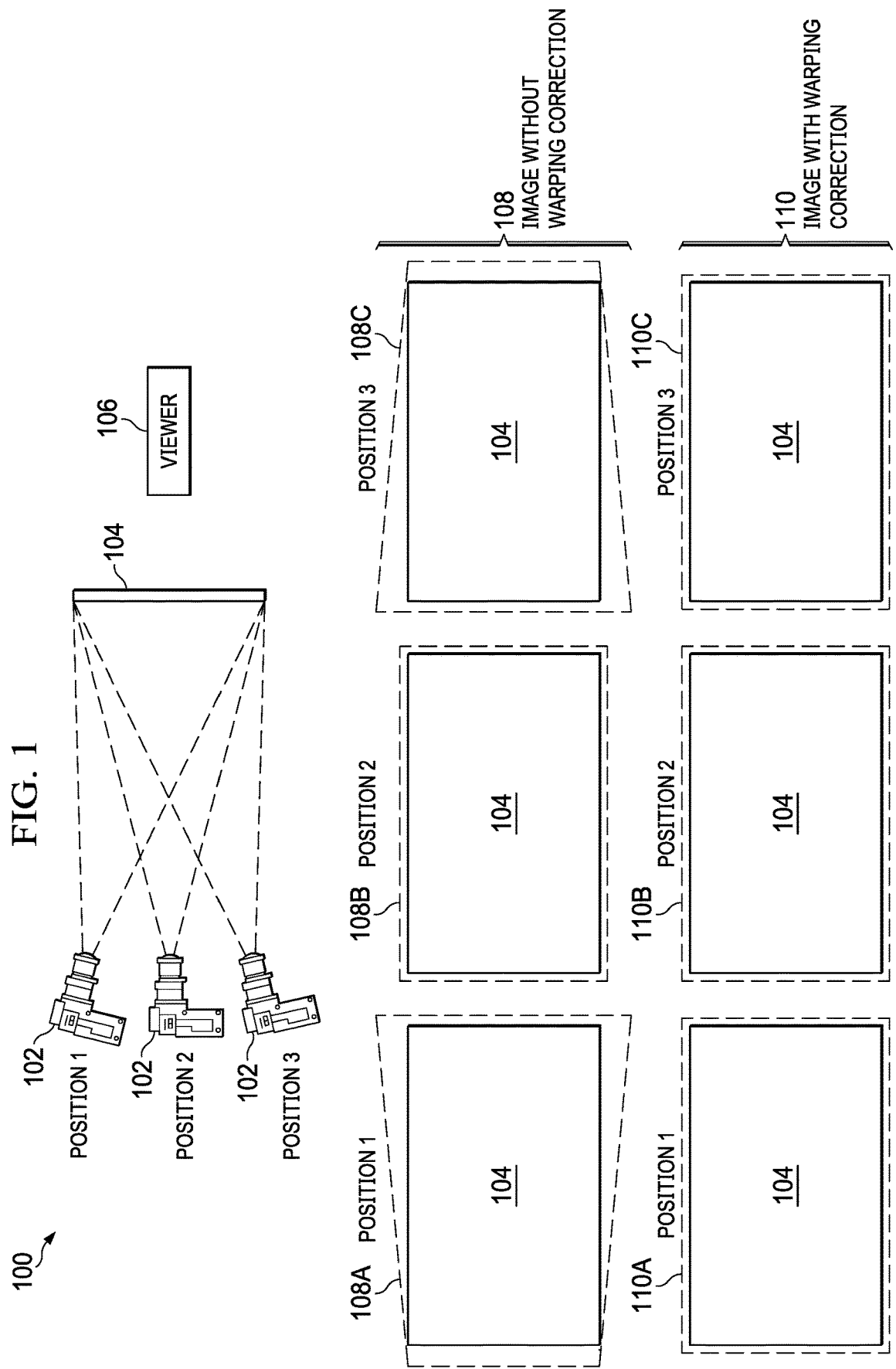
FIG. 1 is a schematic diagram of image distortion and correction for different projector positions in accordance with various examples.

As described above, some projection systems provide a three-dimensional (3D) experience for a viewer without the use of glasses. The 3D experience is provided by using an array of projectors or a smaller number of projectors that move and follow a viewer's head or eyes. However, with moving projectors, the image's geometry may appear distorted to the viewer based on the location and orientation of the projectors with respect to the projection surface.

In examples herein, one or more projectors move relative to a projection surface to provide a 3D viewing experience for a viewer. Warp maps, which are usable by projection systems to warp images and thereby align the images to a physical object or to maintain a rectangular image on non-perpendicular or irregular surfaces, are calculated for each projector at each position. The use of warp maps is also referred to as image warping, projection warping, or geometric correction. During operation, a suitable warp map is retrieved and applied as a function of the projector position. In examples herein, the projector motion follows a predefined and repeatable path.

For each projector position, a warp map is determined by a two-step transformation: transform from projector pixels to camera pixels, and then transform from camera pixels to target surface coordinates. The transformation from projector pixels to camera pixels is computed by displaying a known pattern with the projector and recognizing pattern features with a camera. If the camera position also changes with the projector position, the transformation from camera pixels to target surface coordinates is repeated for each camera position. For example, if the camera position is fixed, a known pattern is displayed with the projector at the first projector position, and the camera is used to recognize features of the pattern. Then the projector is moved to a second projection position, the known pattern is displayed, and the camera recognizes features of the pattern. This procedure is repeated for each of the projector positions. In another example, the camera may move in addition to the projector moving. If the camera moves, the known pattern is displayed and features are recognized for each camera position in combination with each projector position. With the camera in its first position, the projector moves through each of the projector positions, with the camera recognizing pattern features at each projector position. Then, the camera is moved to its second position, and again the projector moves through each of the projector positions, with the camera recognizing pattern features at each projector position. The process is repeated for each camera position. A moving camera may be used, for example, in systems where the projected image is only visible from certain locations, due to the optical properties of the projection surface or due to an obstruction in front of the camera. The camera may move to achieve a complete image of the known pattern for each projector position.

In situations where the projector moves continuously, warp maps are calculated for a selected number of discrete positions along the continuous path. To correct distortion when the projector is not located at one of the discrete positions, interpolation or regression is performed between two stored warp maps corresponding to the discrete positions closest to the position of the projector. The image therefore stays aligned with the target projection surface irrespective of whether the projector is at one of the discrete positions associated with a warp map, or at another position. For systems involving multiple projectors, calibration and interpolation using warp maps for each projector at each projector position are performed. Warp maps may be applied anywhere in the content display pipeline, from an imaging device controller to rendering software. Examples herein choose and apply the correct warp map, or an interpolation or regression of multiple stored warp maps, as a function of projector position. In examples herein, a 3D experience is provided to a user without the use of 3D glasses. If the user moves, the projector or projectors also move, so the user continues to see a properly aligned 3D image even though the user has moved with respect to the display. The systems and methods described herein interpolate between multiple warp maps so the proper warping data is applied to the image as the user moves.

FIG. 1 is a schematic diagram of image distortion and correction of different projector positions according to various examples. FIG. 1 is a system 100 that includes a projector 102 and a projection surface, such as screen 104. Projector 102 projects an image onto screen 104. In system 100, screen 104 lies between projector 102 and viewer 106. In other examples, viewer 106 and projector 102 may be on the same side of screen 104. In one example, system 100 provides a 3D viewing experience for viewer 106 without viewer 106 wearing special glasses. System 100 provides the 3D viewing experience with one of two methods. The first method uses three projectors 102, with a different projector 102 located at each of positions 1, 2, and 3 as shown. The second method uses one projector 102 that moves to each of the positions 1, 2, and 3 during operation. In this example, the second method is used. In other examples, the first method may be used. The number of projectors or the number of positions may vary in other examples.

FIG. 1 includes three projected images 108A, 108B, and 108C (collectively, projected images 108) on screen 104, with one projected image for each of the three positions 1, 2, and 3 of projector 102. Projected images 108 show how the projected images from projector 102 at the three respective positions 1, 2, and 3 appear on screen 104 without warping correction. For example, at position 1 without warping correction, the projected image 108A from projector 102 is not rectangular in shape, but has a trapezoidal shape that does not fit the shape of screen 104. The projected image 108A is represented with a dashed line. A viewer 106 viewing screen 104 with projector 102 in position 1 would perceive the distorted image 108A, instead of an image that matches the dimensions and shape of screen 104. This type of distortion is called keystone distortion, which occurs responsive to the projector 102 not being perpendicular to the screen 104.

When projector 102 is at position 2 without warping correction, the projected image 108B from projector 102 is the same shape as the screen 104, and exhibits little, if any, distortion. This is because projector 102 is perpendicular to screen 104 at position 2. At position 2, little if any warping correction would be applied to the projected image 108B to produce an undistorted image for viewer 106. Projected image 108B is represented with a dashed line, and is shown slightly larger than screen 104 for clarity in this example.

When projector 102 is at position 3 without warping correction, the image 108C from projector 102 is warped with a trapezoidal shape that does not match the shape of screen 104. As seen in system 100, projector 102 is not perpendicular to screen 104 at position 3, so distortion occurs much like the distortion at position 1 (e.g., projected image 108A), although in the opposite direction. Therefore, a viewer 106 viewing screen 104 with projector 102 in position 3 would perceive a distorted image 108C, represented by the dashed line.

Many more projector positions could be shown here, and keystone distortion would occur at each position that is not perpendicular to screen 104. Correcting for keystone distortion involves warping the input video signal into an irregular quadrilateral that, as the video signal is projected, produces a rectilinear image on screen 104. Projected images 110A, 110B, and 110C (collectively, projected images 110) show how the projected images from projector 102 at the three respective positions 1, 2, and 3 appear on screen 104 with warping correction. With warping correction, the projected images 110A, 110B, and 110C projected onto screen 104 appear rectilinear at each projector position 1, 2, and 3. Warping correction is performed by creating warp maps for various projector positions, and applying a selected warp map to the image based on the position of projector 102. In an example herein, warp maps are created for a finite number of positions of projector 102, and then the respective warp map is applied when projector 102 is in a position associated with that warp map. When the projector 102 is in a position that is not associated with a specific warp map, but the position is between two other positions where warp maps have been created, then an interpolation or regression is performed between the two existing, stored warp maps and the projected image is corrected based on that interpolation or regression.

Figure 2A:
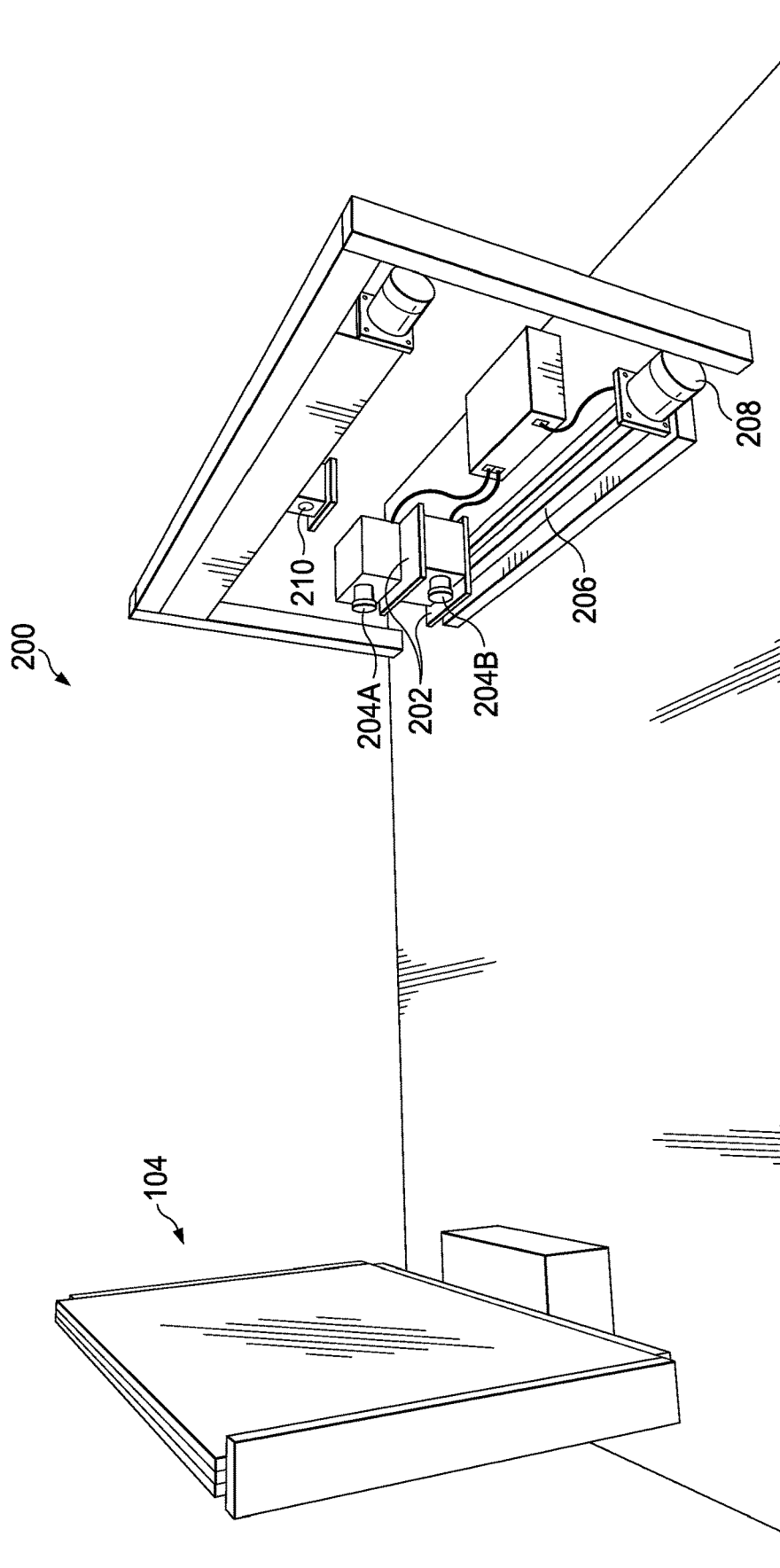
FIG. 2A is a system for providing a 3D-viewing experience with multiple projectors in accordance with various examples.

FIG. 2A is an example system 200 for providing a 3D-viewing experience with multiple projectors according to various examples. System 200 includes screen 104. In this example, a viewer 106 (not shown) views screen 104 from the left side of screen 104 as shown in FIG. 2A. Screen 104 may be a high gain elliptical rear projection screen in one example. Screen 104 may have a narrow scattering profile in an example, which scatters light vertically more than horizontally. Screen 104 could include a diffuser screen, one or more Fresnel lenses, a holographic screen, or a combination thereof in various examples. Screen 104 may be a front projector screen in other examples. In one example system with two projectors, screen 104 may shape the light from the projectors so each eye of a viewer 106 only receives light from one of the two projectors.

System 200 includes a projector rig 202. In this example, projector rig 202 includes two projectors 204A and 204B. Projectors 204A and 204B are mounted in fixed positions on projector rig 202. Projectors 204A and 204B are offset vertically and horizontally on projector rig 202. Projector rig 202 is configured to move horizontally along a movement path provided by rail 206. Motor 208 moves projector rig 202 along rail 206. Any suitable motor or other mechanical device is useful in other examples to move projector rig 202. In this example, rail 206 is approximately parallel to screen 104. In some examples, projector rig 202 may move in a continuous manner to any position along rail 206, not just to a limited number of specific discrete positions.

System 200 includes camera 210. Camera 210 is used for calibration of system 200. Calibration and the creation of warp maps is described below. Camera 210 captures images of patterns projected onto screen 104 by projectors 204A and 204B, and then a controller or processor (not shown) uses those images to create warp maps. The warp maps are created for each projector 204A and 204B, and for multiple positions of each of the projectors 204A and 204B. The multiple warp maps are used to correct the distortion in the image caused by the position of the projector 204A, 204B so the viewer 106 sees a rectilinear image without keystone distortion.

In operation, system 200 has a calibration phase in which camera 210 captures images of computer vision test patterns projected by each projector 204A and 204B at different positions of projectors 204A, 204B. Images are captured by camera 210 for each projector 204A, 204B at a number of projector positions to create warp maps, such as five positions for each of projector 204A and projector 204B, in one example. In this example, projectors 204A and 204B are set at a first position along rail 206 and an image of the test pattern is captured by camera 210 for each projector 204A and 204B. Then, projector rig 202 moves to a second position on rail 206, and images of the test pattern are captured by camera 210 for each projector 204A and 204B at the second position. This process repeats for a number of positions along rail 206. A warp map is then created for each projector 204A and 204B at each position. When projector 204A or 204B is in one of those positions, the warp map for that position is used to correct images projected to screen 104. When projector 204A or 204B is located between the positions for which the warp maps were created, an interpolation or regression is performed as described below using multiple warp maps to correct the image projected to screen 104.

After the calibration phase is completed, the warp maps are stored and available for system 200 to use while projecting an image to a viewer 106. While not shown here, a head tracking system using one or more cameras or other sensors is implemented to track the movement of the eyes of viewer 106. The projectors 204A and 204B move horizontally so each eye of viewer 106 continues to receive light from one of the two projectors 204A and 204B. Two different images with different perspectives projected to each of viewer 106's eyes provide a 3D visual effect. The projectors 204A and 204B move horizontally along rail 206 as the eyes of the viewer 106 move so the proper image is projected to each eye of viewer 106 at the appropriate time.

FIG. 2B is a front view 250 of projector rig 202 for providing a 3D-viewing experience with multiple projectors in accordance with various examples. The components in FIG. 2B are also shown in FIG. 2A, and like numerals depict like components. Projectors 204A and 204B are mounted in fixed positions on projector rig 202. Projectors 204A and 204B are offset vertically and horizontally on projector rig 202. Projector rig 202 is configured to move horizontally along rail 206. Motor 208 moves projector rig 202 along rail 206. Camera 210 is also shown in front view 250, and is used for calibration of system 200.

Figure 3A:
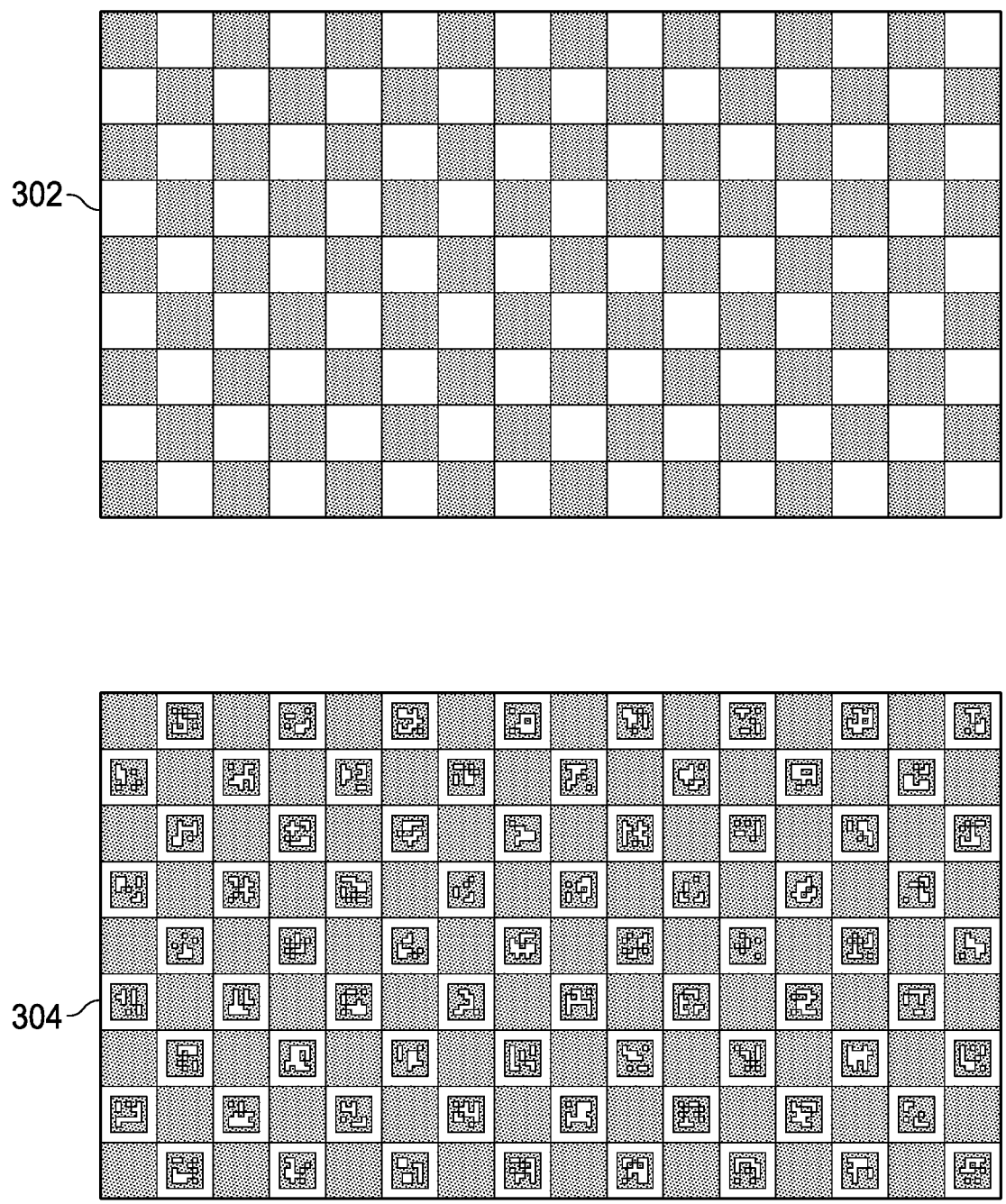
FIG. 3A is a pair of computer imaging test patterns usable for calibration in accordance with various examples.

FIG. 3A is a pair of computer imaging test patterns usable for calibration according to various examples. Pattern 302 is a chessboard pattern with alternating light and dark squares. Camera 210 captures images of pattern 302 projected by projectors 204A and 204B at various projector positions, and then a controller or processor locates the corners of the squares for each projector position. Corners may be located by detecting the changes in the colors of the pixels from dark to light near the corners. The pattern 302 appears slightly different at each projector position due to keystone distortion. The processor or controller determines where each corner is located, and uses that information to create a warp map that warps the projected image into a quadrilateral. Warp maps may be created using geometric transformations, numerical distortion correction, parametric distortion models, or any other suitable process. Using the warp maps, for each projector position, the projected image aligns with the screen corners. The final result is that the image appears rectangular and correct for each projector position.

Pattern 304 is a more complex pattern than pattern 302 that may be used in some examples. When moving projectors are used as described above, the projected images are often less uniform than with static projectors. Decreased uniformity makes it more difficult to determine features of the pattern with the camera and processor. Therefore, a more complex pattern such as pattern 304 is useful. Pattern 304 is an example of ArUco markers. ArUco markers are small two-dimensional (2D) barcodes. Each ArUco marker corresponds to a number, encoded into a small grid of black and white pixels as shown. An ArUco marker is a square marker with a wide black border and an inner black and white matrix that determines its identifier. The black border facilitates fast detection in an image, and the binary codification (e.g., the black and white pixels) allows the markers to be identified. A dictionary of specific ArUco markers is used for a particular application. Each detected marker includes the position of its four corners in the image and the identifier of the marker. An ArUco decoding algorithm is capable of locating, decoding, and of estimating the pose (location and orientation in space) of any ArUco markers in the camera's field of view. The processor or controller uses the location or position of the projection, and its orientation information (based on the ArUco marker detection), to create a warp map.

FIG. 3B is a diagram of warp maps with different numbers of warp points in accordance with various examples herein. Warp map 320 is a warp map with a smaller number of warp points, while warp map 350 is an advanced warp map with a larger number of warp points. A warp map with a larger number of warp points, such as warp map 350, may create a smoother and more accurate warp map. In an example, the top edge of warp map 320 includes three warp points 322, 324, and 326. These warp points may also be referred to as control points. Warp map 320 includes other warp points at the intersections of the lines in warp map 320, but those warp points are not labeled in FIG. 3B for simplicity. The warp points 322, 324, 326, and the other warp points in warp map 320 are used to correct the warping in a projected image and present a stable and rectilinear image to a viewer.

The top edge of warp map 350 includes warp points 352A, 352B, 352C, etc., to 352N. In the example shown, the top edge of warp map 350 includes 19 warp points. Advanced controllers and/or advanced warping engines are capable of using a larger number of warp points. Warp map 350 is a more advanced warp map than warp map 320, and therefore warp map 350 has 19 warp points along its top edge instead of the three warp points in warp map 320. With more warp points, warp map 350 is a smoother and more precise warp map than warp map 320. The controllers, processors, and warping engines described herein are capable of using advanced warp maps with a larger number of warp points to provide more accurate warping correction than warp maps with a smaller number of warp points. Also, because the warp points in warp map 350 are closer together than the warp points in warp map 320, interpolation between warp points will produce more accurate results with warp map 350 than with warp map 320.

FIG. 4 is a graph 400 of images from two projectors at different horizontal positions along rail 206 according to various examples. ArUco markers are used at each horizontal position to map projector pixels to camera pixels in this example. The x-axis and y-axis represent normalized screen positions. On the y-axis, screen rectangle 402, represented by a dashed line, is located between 0.00 and 1.00. On the x-axis, screen rectangle 402 is located between 0.00 and 1.00.

Dotted rectangle 404 represents the largest visible rectangle based on the projector positions. Dotted rectangle 404 is the largest possible rectangle that can be inscribed inside the warp maps. The dotted rectangle 404 is the area within all of rectangles 410 to 428.

Rectangles 410 to 428 each represent a mapping between projector pixels and camera pixels for a discrete projector position using ArUco markers in this example. As the projectors move left and right along rail 206, the image begins clipping on the sides, so only a subset of projector pixels is within screen rectangle 402.

For example, rectangles 410, 412, 414, 416, and 418 represent images from projector 204A at five different positions of projector 204A. Rectangle 410 represents projector 204A when it is at a first position, the farthest left position of projector 204A. At this position, the left edge of rectangle 410 is outside screen rectangle 402. The right edge of rectangle 410 is within screen rectangle 402 as shown.

After projector 204A moves one position to the right to a second position, rectangle 412 results. Moving projector 204A to another position to the right to a third position results in rectangle 414. Moving projector 204A to another position to the right to a fourth position results in rectangle 416, and moving projector 204A to the fifth and far right position results in rectangle 418.

For example, rectangles 420, 422, 424, 426, and 428 represent images from projector 204B at five different positions of projector 204B. Projector 204B is located vertically below and horizontally to the right of projector 204A in this example. Therefore, rectangles 420, 422, 424, 426, and 428 associated with projector 204B are shown slightly to the right and below rectangles 410, 412, 414, 416, and 418, respectively. Rectangle 420 represents projector 204B when it is at the first and farthest left position. At this position, the left edge of rectangle 420 is outside screen rectangle 402. The right edge of rectangle 420 is near the right edge of screen rectangle 402 as shown.

After projector 204B moves one position to the right to a second position, rectangle 422 results. Moving projector 204B another position to the right to a third position results in rectangle 424. Moving projector 204B another position to the right to a fourth position results in rectangle 426, and moving to the fifth and far right position results in rectangle 428.

Interpolation or regression may be used to fill in the gaps between the five positions shown for projectors 204A and 204B. If a warp map is created for each projector 204A and 204B at each of the five positions, interpolation may be used when a projector 204A or 204B is between two of those five positions. When the projector is between two positions, the warp maps for each of those two positions may be combined with an interpolation function or a regression to determine the warping correction to apply to the projected image while the projector is located at that in-between position.

FIG. 5 is a graph 500 of the largest visible rectangle mapped to projector pixel coordinates according to various examples. FIGS. 4 and 5 display similar information, but in different coordinate systems. The rectangles in FIG. 5 show the projector pixels that are used to provide an image to the screen rectangle 402 at each position of the projector shown in FIG. 4. Because the projectors in FIG. 4 project images that cover screen rectangle 402 but are also outside of screen rectangle 402 as shown in FIG. 4, only a subset of projector pixels at each projector position are needed to provide the image that completely covers screen rectangle 402. Those subsets of projector pixels are represented by the rectangles in FIG. 5. The x-axis and y-axis in graph 500 represent the physical projector pixels, with 1920 pixels along the x-axis and 1080 pixels along the y-axis. Dotted rectangle 502 represents the largest visible rectangle. In this example, each solid rectangle represents a discrete projector position. Rectangles 510, 512, 514, 516, and 518 represent images from the second projector, such as projector 204B, at five different projector positions. For example, rectangle 510 represents the projector pixels of projector 204B when it is at the farthest right projector position, and rectangle 518 represents projector 204B when it is at the farthest left projector position.

Likewise, rectangles 520, 522, 524, 526, and 528 represent images from a second projector, such as projector 204A, at five different projector positions. For example, rectangle 520 represents projector 204A when it is at the farthest right projector position, and rectangle 528 represents projector 204A when it is at the farthest left projector position. In this example, projector 204B is offset vertically from projector 204A as well as horizontally, which is evident from the horizontal and vertical offset between the five rectangles for each projector.

In one example, as shown in FIG. 4 and described above, rectangle 410 represents projector 204A when it is at a first position, the farthest left position of projector 204A. At this position, the left edge of rectangle 410 is outside screen rectangle 402. The right edge of rectangle 410 is within screen rectangle 402 as shown. Therefore, the projector pixels on the bottom right portion of rectangle 410 produce an image for display on screen rectangle 402. As shown in FIG. 5, rectangle 528 corresponds to rectangle 410, and shows that the bottom right portion of the projector pixels produce the image displayed on screen rectangle 402. If calibration is correct, the pixels within rectangle 528 will produce an image on screen rectangle 402 that fills screen rectangle 402 when projector 204A is at the farthest left position.

As projectors 204A and 204B move horizontally, their respective projected rectangles also shift positions left or right. These rectangles represent projector space, which is where the light that is projected from the respective projector 204A or 204B shines. As the projectors 204A and 204B move, images projected by projectors 204A and 204B also move in projector space so the images appear stable to a viewer. The movement of projected images in projector space is described below with respect to FIGS. 8A to 8C and 9A to 9C.

In one example, advanced controllers can produce warp maps with greater numbers of warp points than previous generation controllers. These advanced controllers can use any arbitrary number of warp points in some examples. Therefore, a more fine-tuned control of the pixel mapping between coordinate spaces is possible. More warp points provide for a smoother and more accurate warp map in some examples.

Figure 6:
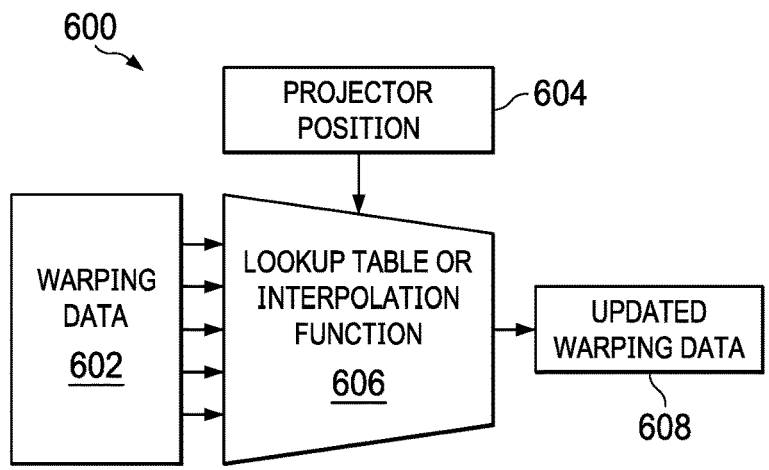
FIG. 6 is a block diagram of inputs and outputs for dynamic image warping in accordance with various examples.

FIG. 6 is a block diagram 600 of inputs and outputs for dynamic image warping according to various examples. Warping data 602 and projector position 604 are inputs provided to a processor or controller. The processor or controller receives these inputs and uses either a lookup table or interpolation function 606 to find or create the appropriate warping data. The updated warping data 608 is produced, and the controller or processor applies the updated warping data 608 to the projected image. Warping data 602 is precalculated and stored in a memory. Warping data 602 may include warp maps for one or more positions for each projector in the projection system. For example, a system with two projectors and five preset positions for each projector would create and store ten warp maps in warping data 602. The warp maps may include precalculated data for warping an image, or may include a function that is applied to the image to correct for distortion. Any suitable type of warp map is useful in various examples.

A controller or processor (not shown in FIG. 6) receives warping data 602 and the projector position 604. A lookup table (LUT) or interpolation function 606 is useful for determining updated warping data 608. When projector position 604 corresponds to a position where a warp map has been precalculated, a LUT may be accessed by the controller or processor to retrieve the warping data 602 for that projector position. However, when projector position 604 is between positions for which warp maps have been created, an interpolation function or regression is performed by the controller or processor to determine the warping data for this intermediate position. Whichever method is used (LUT or interpolation), the updated warping data 608 is provided to the imaging system and used to correct the distortion caused by the projector position. The procedure described with respect to FIG. 6 is performed for each projector in the projection system.

Figure 7:
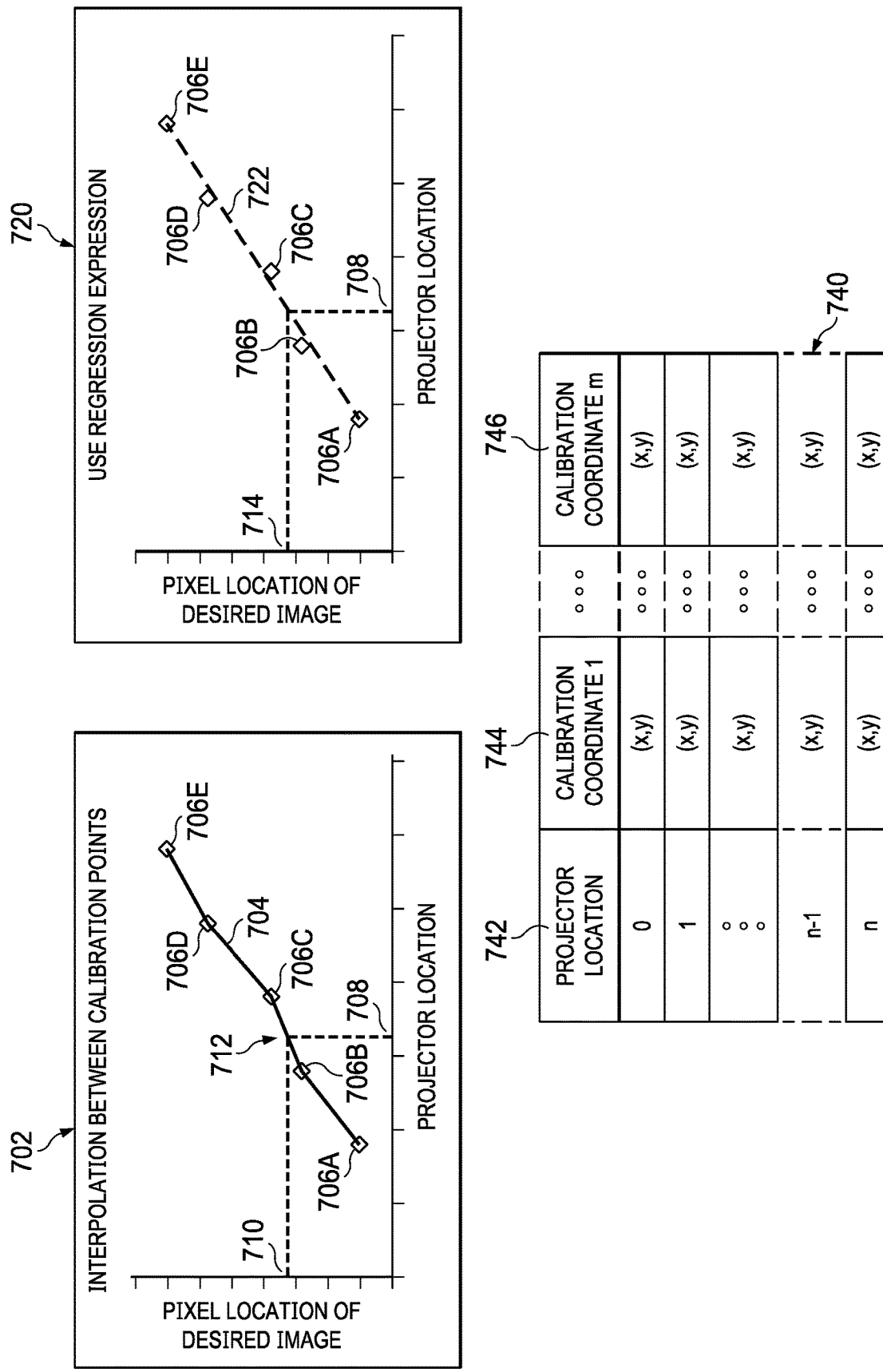
FIG. 7 is a diagram of the results of three calibration usage methods in accordance with various examples.

FIG. 7 is a diagram of the results of three calibration usage methods according to various examples. A first method is represented by graph 702, which is an example of interpolation between calibration points. Graph 702 has an x-axis that corresponds to projector position, and a y-axis that corresponds to the y-coordinate of the pixel location for a pixel of the compensated image. Another graph is used for the x-coordinate of the pixel of the compensated image. Five discrete projector positions are shown in this example, marked by five points on curve 704, labeled 706A, 706B, 706C, 706D, and 706E. When the projector is at one of the discrete projector positions, the y-coordinate of the pixel location of the compensated image is determined from the value on the y-axis of that respective point (e.g., point 706A). However, when the projector is at a position between the discrete points on curve 704, such as position 708, then interpolation is performed to determine the y-coordinate 710 that corresponds to the projector being at position 708. For example, a linear interpolation is performed between points 706B and 706C. Position 708 intersects the line between points 706B and 706C at point 712, and that information is used to find the y-coordinate of the pixel in the compensated image, represented by point 710 on the y-axis of graph 702. Point 710 indicates the y-coordinate for a pixel of the compensated image, and is a representation of the warping data applied to the projector when the projector is at position 708. The warping data adjusts the y-coordinate of the pixel to y-coordinate 710 to compensate for image warping.

Graph 720 represents an example of regression used to find warping data for the y-coordinate of a given pixel when the projector is at a given projector location. A separate graph is used to find warping data for the x-coordinate of the given pixel. In this example, a linear regression is performed to find a linear equation that fits the five points 706A, 706B, 706C, 706D, and 706E. The linear regression may be performed during a calibration step. In graph 720, dotted curve 722 represents the linear equation. In this example, the projector position, such as position 708, is provided to the linear equation and the compensated y-coordinate of the pixel 714 is determined. The linear regression equation receives the projector position as an input and produces the compensated y-coordinate pixel location as the output. In some examples, regression is faster to use than linear interpolation, as there is only one line in the regression example as opposed to lines between each point in the interpolation example. The speed and accuracy requirements of the system may be considered when choosing which calibration usage method to use. In other examples, regressions other than linear regressions are useful.

The third method uses a lookup table 740. If the projector positions include a known, limited number (such as 20 projector positions in one example), lookup table 740 may be used to determine warping data. That is, offsets may be precalculated for the coordinates in projector space for each projector position. In this example, n projector positions are listed in column 742, with one projector position in each row. Column 744 includes the calibration coordinate for a first pixel, and column 746 includes the calibration coordinate for a pixel m, with columns from 1 to m between columns 744 and 746. Lookup table 740 is used to find calibration coordinates based on the discrete projector positions in column 742. With a large number of projector positions, the use of lookup table 740 may be slower than the linear interpolation or regression methods described above. With a smaller number of projector positions, lookup table 740 may be faster than the linear interpolation or regression method. Also, lookup table 740 may not be practical for a system where the projector moves in a continuous motion rather than just moving to discrete positions, because the system may need either a large number of lookup tables or may need to interpolate between lookup tables.

Figure 8A:
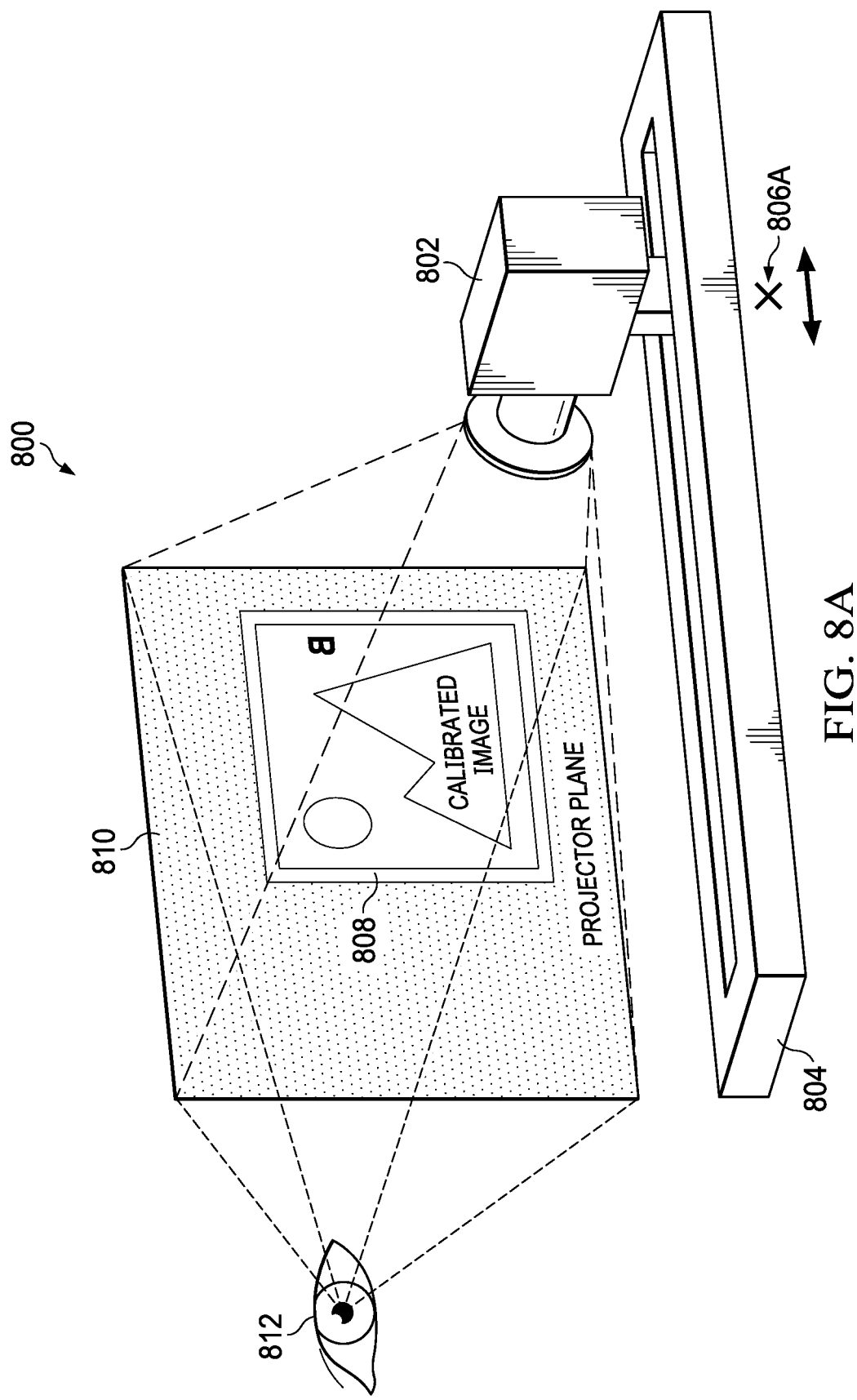
FIG. 8A is a system for implementing dynamic image warping for moving projector systems in accordance with various examples.

FIG. 8A is an example system 800 for implementing dynamic image warping for moving projector systems in accordance with various examples. In system 800, projector 802 moves along a rail 804. In this example, projector 802 is at position 806A (marked with an X) along rail 804. Projector 802 projects a calibrated image 808 to projector plane 810. Calibrated image 808 appears still and rectilinear from the perspective of viewer 812. System 800 shows only one projector 802 for simplicity, but multiple projectors 802 may be used in other examples. For example, a first projector may project images to a first eye of viewer 812 and a second projector may project images to a second eye of viewer 812, to provide viewer 812 with a 3D experience.

Figure 8B:
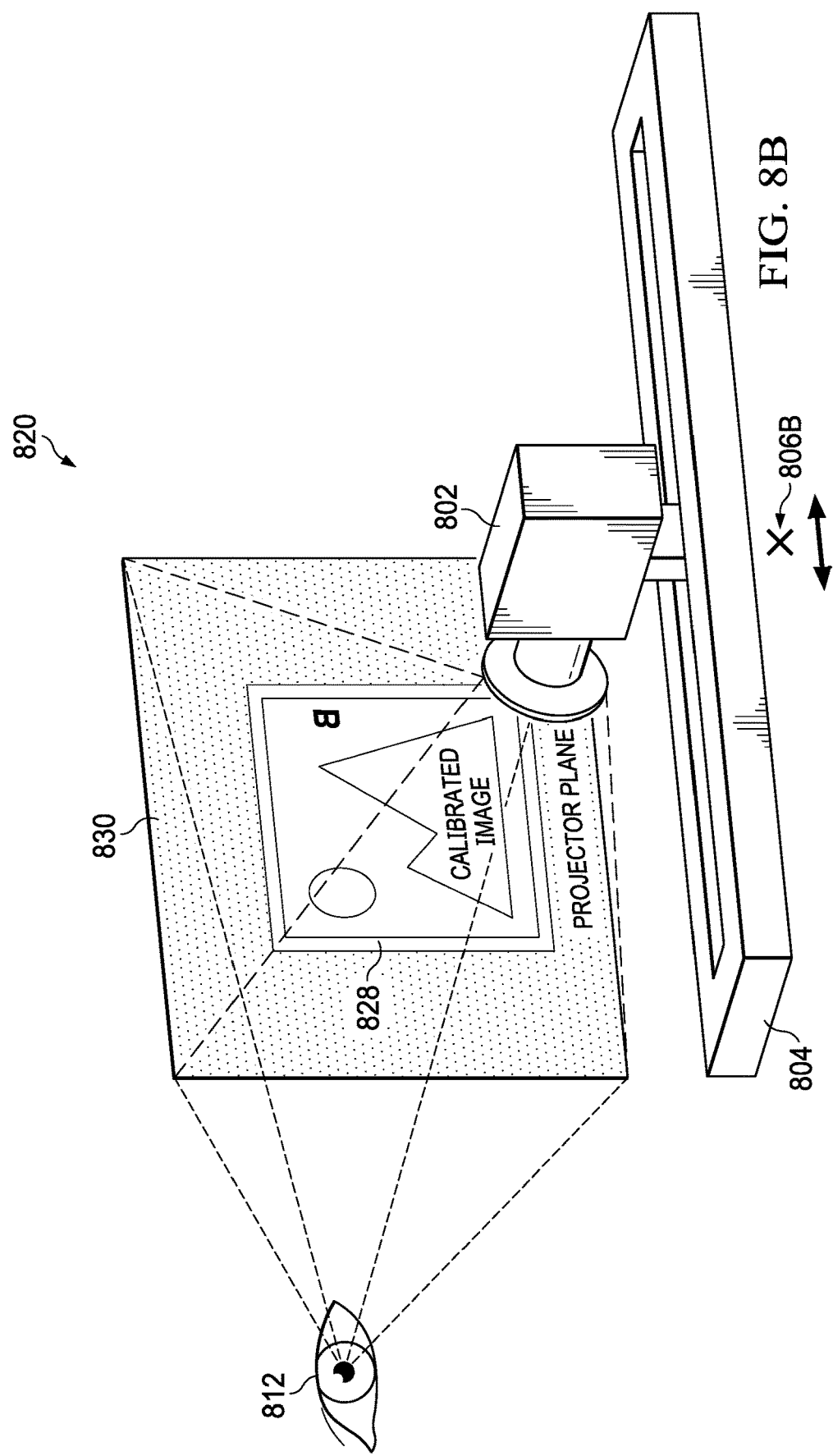
FIG. 8B is a system for implementing dynamic image warping for moving projector systems in accordance with various examples.
Figure 8C:
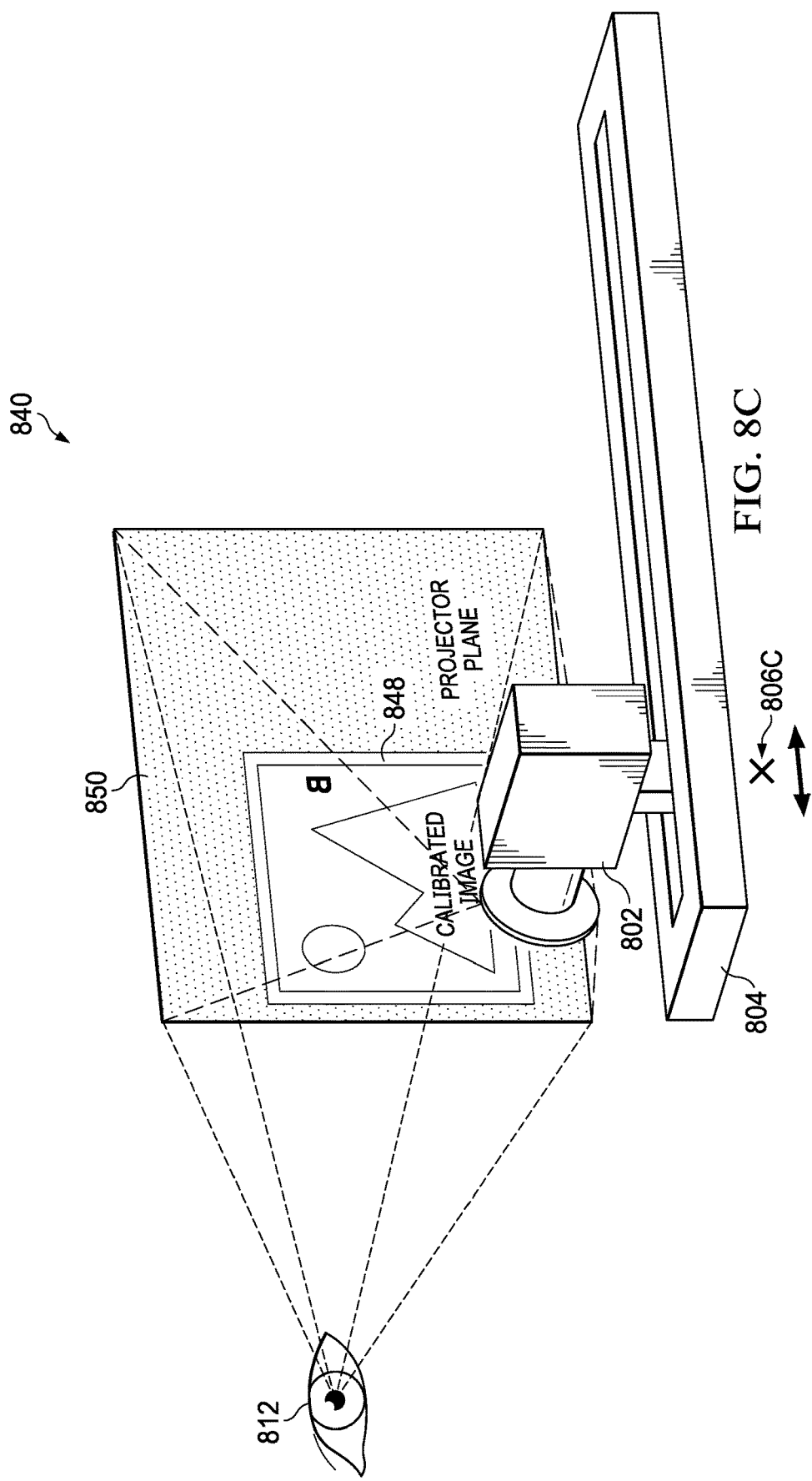
FIG. 8C is a system for implementing dynamic image warping for moving projector systems in accordance with various examples.

Projector plane 810 is the plane where the image is projected and moves with projector 802. Projector plane 810 may coincide with a screen between projector 802 and viewer 812 in an example. In this example, projector 802 is at the right edge of rail 804 at position 806A. Calibrated image 808 is shown slightly to the right side of projector plane 810 (from the perspective of projector 802). The calibrated image 808 has been calibrated using warp maps as described above so calibrated image 808 appears rectilinear to viewer 812. As projector 802 moves (as shown in FIGS. 8B and 8C), calibrated image 808 should appear to stay in the same place from the perspective of viewer 812. As projector 802 moves along rail 804, calibrated image 808 moves inside projector plane 810 to create a stable rectangular image for viewer 812.

FIG. 8B is an example system 820 for implementing dynamic image warping for moving projector systems in accordance with various examples. In FIG. 8B, projector 802 has moved along rail 804 to a second position 806B. Position 806B is to the left of position 806A (shown in FIG. 8A) from the perspective of the projector 802. Projector 802 projects a calibrated image 828 to projector plane 830. Calibrated image 828 appears still and rectilinear from the perspective of viewer 812. Calibrated image 828 is shown close to the center of projector plane 830 (from the perspective of projector 802). The calibrated image 828 has been calibrated using warp maps as described above so calibrated image 828 appears rectilinear to viewer 812.

FIG. 8C is an example system 840 for implementing dynamic image warping for moving projector systems in accordance with various examples. In FIG. 8C, projector 802 has moved along rail 804 to a third position 806C. Position 806C is to the left of position 806A (shown in FIG. 8A) and position 806B (shown in FIG. 8B) from the perspective of the projector 802. Projector 802 projects a calibrated image 848 to projector plane 850. Calibrated image 848 appears still and rectilinear from the perspective of viewer 812. Calibrated image 848 is shown near the left side of projector plane 850 (from the perspective of projector 802). The calibrated image 848 has been calibrated using warp maps as described above so calibrated image 848 appears rectilinear to viewer 812.

As depicted in FIGS. 8A, 8B, and 8C, as projector 802 moves horizontally, the projector plane 810 (830, 850) also moves with projector 802. Because the projector plane moves, the location of the calibrated image within the projector plane also moves, so the calibrated image appears stable to viewer 812. In examples herein, warp maps are applied to the images projected by projector 802 based on the position of projector 802 so the viewer 812 perceives an image that is stable and rectilinear. Different warp maps, interpolation of warp maps, a linear regression of warp maps, or a lookup table of warp data may be applied to the projected images in various examples, as described above.

Figure 9A:
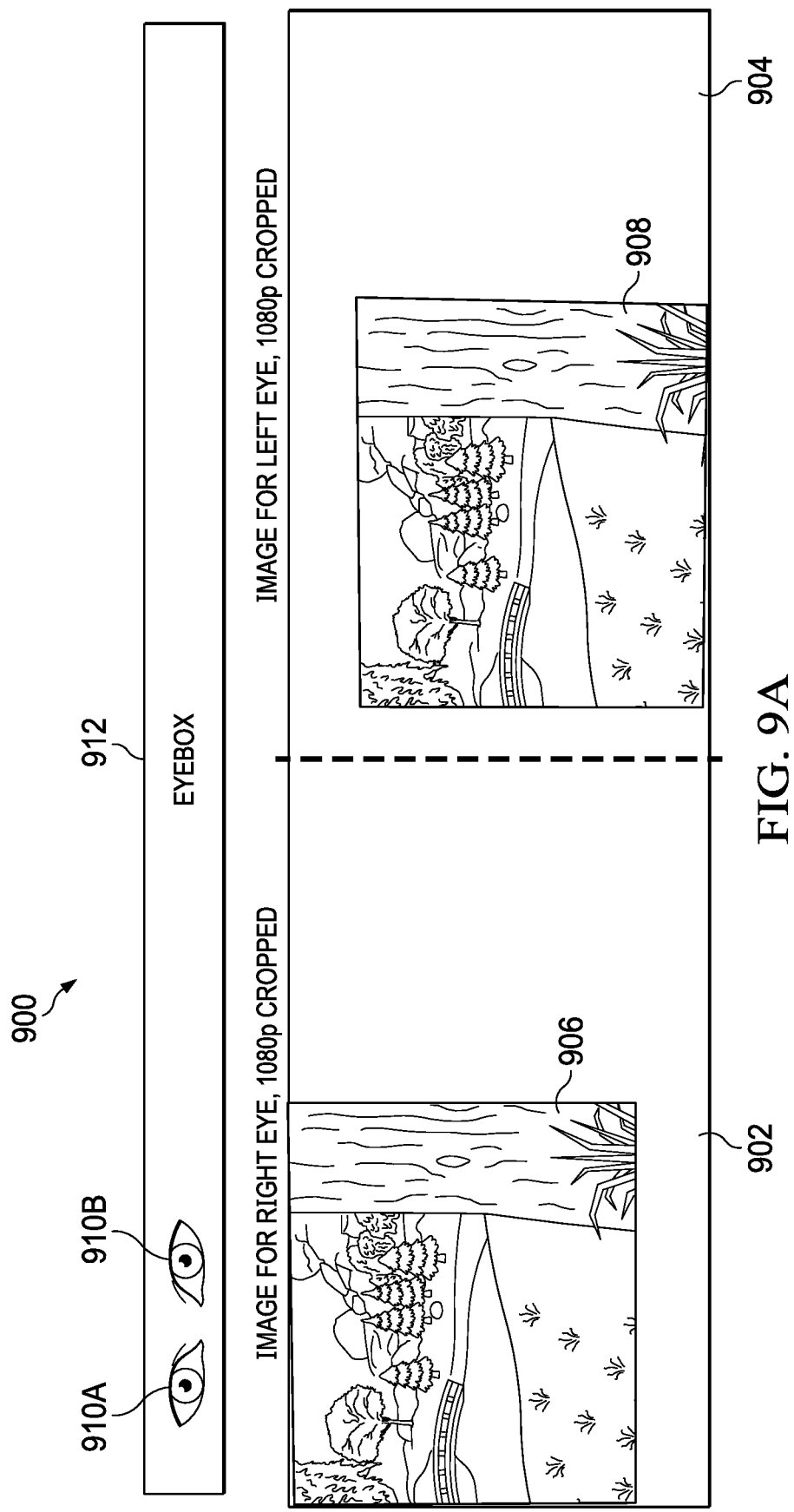
FIG. 9A is a diagram of images mapped in projector space for a two-projector system in accordance with various examples.

FIG. 9A is a diagram of images mapped in a projector plane for a two-projector system in accordance with various examples. Diagram 900 includes projector plane 902 for the right eye of a viewer, and projector plane 904 for the left eye of the viewer. In this example, a first projector projects images to the viewer's right eye, and a second projector projects images to the viewer's left eye. Image 906 is projected to the viewer's right eye, and image 908 is projected to the viewer's left eye. As seen in projected images 906 and 908, the right eye of the viewer perceives a slightly different image (906) than the image (908) perceived by the left eye of the viewer. Images 906 and 908 are also offset horizontally and vertically, because in this example the two projectors are offset horizontally and vertically. In another example, the projectors may be offset horizontally but not vertically. The slight difference in the images 906 and 908 as perceived by the different eyes of the viewer creates a 3D effect without the viewer using special glasses.

FIG. 9A includes eyes 910A and 910B (collectively, eyes 910) that represents the locations of the viewer's eyes within an eyebox 912. Eyebox 912 is the horizontal location of the viewer's eyes. As the viewer moves his or her head from left to right, a sensor senses that movement, and a controller instructs the two projectors to move left or right to match the eye location of the viewer's eyes. In FIG. 9A, the viewer's head and eyes 910 are on the left side of eyebox 912. In this example, projected images 906 and 908 are also closer to the left side of their respective projector planes 902 and 904. As the viewer moves his or her head to the right, images 906 and 908 will move to the right in the projector plane as well, so as to produce a stable image from the perspective of the viewer. As the viewer's eyes 910A and 910B move within eyebox 912, the projectors move to adjust the projected image to move with the viewer's eyes 910. A warp map is applied to the projected images based on the position of each projector.

Figure 9B:
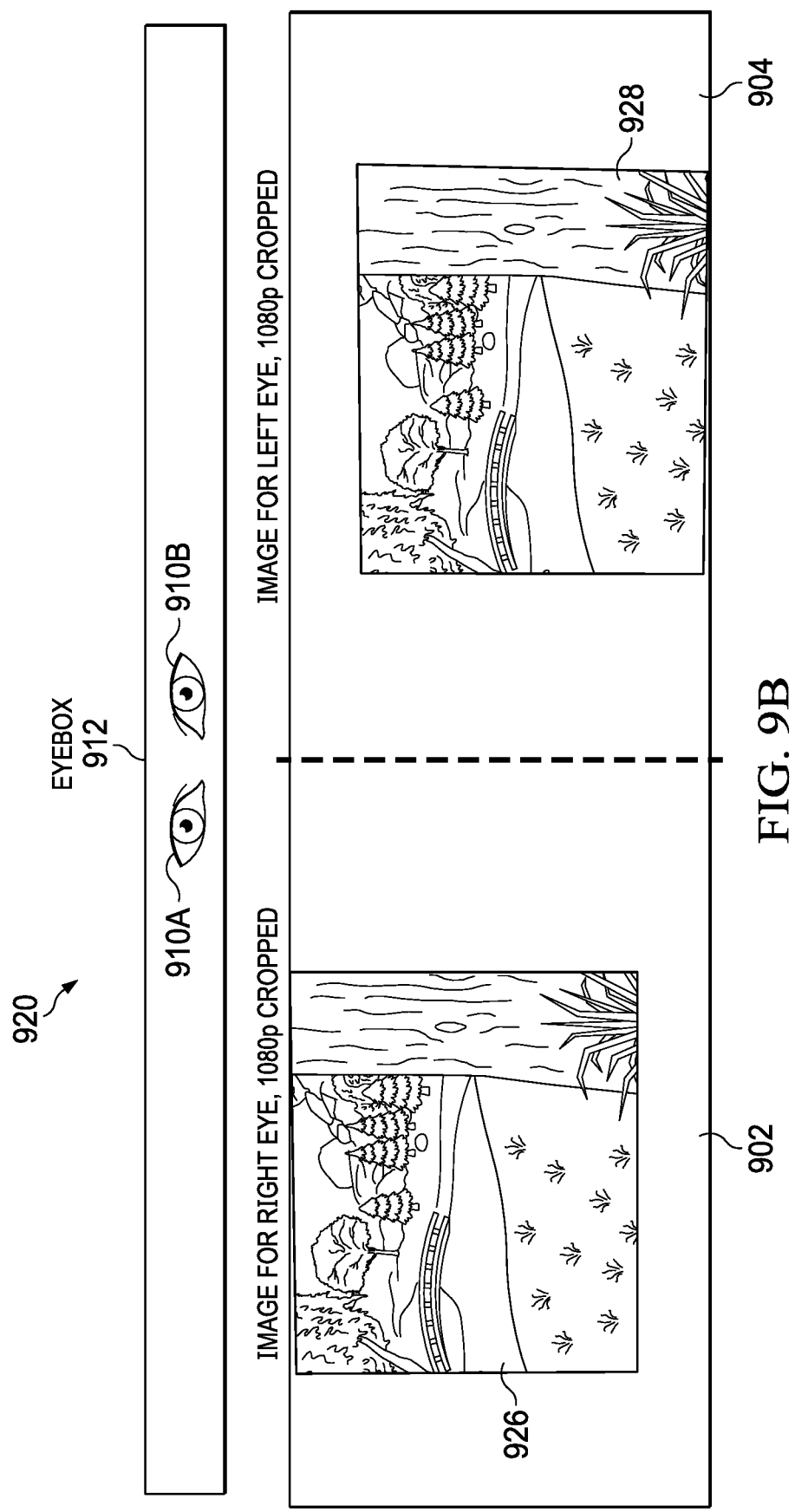
FIG. 9B is a diagram of images mapped in projector space for a two-projector system in accordance with various examples.

FIG. 9B is a diagram 920 of images mapped in projector planes for a two-projector system according to various examples. Diagram 920 includes projector plane 902 for the right eye of a viewer, and projector plane 904 for the left eye of the viewer. In this example, image 926 is projected to the viewer's right eye, and image 928 is projected to the viewer's left eye. Here, eyes 910 are in the center of eyebox 912. This means the viewer's eye location is near the center of eyebox 912. Therefore, projected images 926 and 928 are also near the center of their respective projector planes 902 and 904. Images 926 and 928 are still offset horizontally and vertically like images 906 and 908 were in FIG. 9A, because in this example system the orientation of the projectors is fixed with respect to one another. Warp maps are applied to the projected images based on the position of each projector.

FIG. 9C is a diagram 940 of images mapped in projector planes for a two-projector system according to various examples. Diagram 940 includes projector plane 902 for the right eye of a viewer, and projector plane 904 for the left eye of the viewer. In this example, image 946 is projected to the viewer's right eye, and image 948 is projected to the viewer's left eye. Here, eyes 910 are on the right of eyebox

912. This means the viewer's eye location is near the right of eyebox 912. Therefore, projected images 946 and 948 are also nearer to the right edge of their respective projector planes 902 and 904. Images 946 and 948 are still offset horizontally and vertically like images 906 and 908 were in FIGS. 9A and 9B, because in this example system the orientation of the projectors is fixed with respect to one another.

A comparison of images 906, 908, 926, 928, 946, and 948 between FIGS. 9A, 9B, and 9C demonstrates that the image viewed by the viewer has a slight perspective shift as the viewer moves his or her head and eyes from one side of the eyebox 912 to the other side. For example, images 906 and 908 include a tree along the left edge of the images in FIG. 9A. In FIG. 9B, more of the tree is visible in images 926 and 928 than in FIG. 9A. In FIG. 9C, more of the tree is visible in images 946 and 948 than in FIG. 9B. Therefore, as the viewer moves his or her head and eyes from left to right in eyebox 912, the viewer sees more of the image on the left edge. The 3D effect of the two-projector system described herein provides this perspective shift to the viewer. Also, the warp maps are applied as described above so each projector projects a rectilinear image at each projector position.

Figure 10:
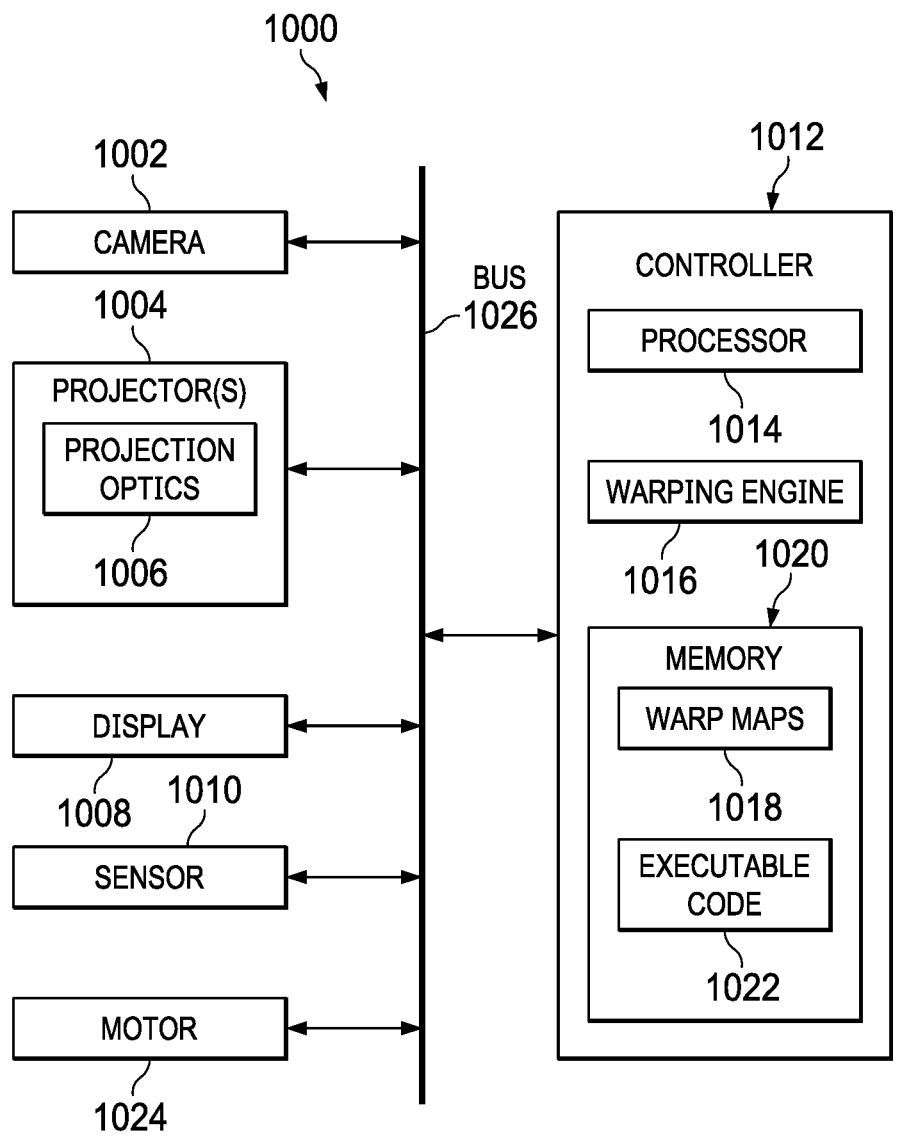
FIG. 10 is a schematic diagram of a system for implementing dynamic image warping in accordance with various examples.

FIG. 10 is a schematic diagram of a system 1000 for implementing dynamic image warping in accordance with various examples herein. System 1000 includes a camera 1002 and one or more projectors 1004. Camera 1002 is configured to capture and store images of patterns projected by projectors 1004 to develop warp maps for projectors 1004. Projectors 1004 include projection optics 1006 to project images onto a display 1008. System 1000 also includes a sensor 1010 configured to track the movement of a viewer's head or eyes and provide a sensor reading so projectors 1004 may move responsive to the viewers movement. Sensor 1010 may be integrated into another component of system 1000, such as camera 1002, projector 1004, or controller 1012.

Controller 1012 includes one or more processors 1014. Processors 1014 may include a central processing unit (CPU), a graphics processing unit (GPU), or a combination of multiple processors. A processor 1014 may generate a warp map, while another processor may apply the warp map. In another example, a processor 1014 may generate and apply a warp map. Controller 1012 also includes a warping engine 1016 in this example. A warping engine includes specialized hardware (and potentially software) that is designed for high performance during warping operations, such as applying warp maps to images. Warping engine 1016 may also apply warp maps 1018 to images according to examples herein. Warp maps 1018 are stored in memory 1020. Warp maps 1018 may be stored in any suitable memory in any suitable component of system 1000. Memory 1020 also includes executable code 1022. The executable code 1022, when executed by a processor 1014 or the controller 1012, causes the processor 1014 or controller 1012 to perform one or more of the actions described herein. In some examples, processor 1014 may perform the actions of warping engine 1016, such as applying warp maps to projected images.

Controller 1012 may control and/or interact with the camera 1002 and/or the projectors 1004. Controller 1012 may also control and/or interact with sensor 1010, display 1008, and motor 1024. Motor 1024 is configured to move projectors 1004 according to examples herein. Projectors 1004 may move in one dimension as described herein. In other examples, projectors 1004 may move in two dimensions or in three dimensions with the use of one or more motors 1024.

Controller 1012 may interact with camera 1002 and projectors 1004 via bus 1026. Controller 1012 may interact with camera 1002 to capture images used for the creation of warp maps 1018 by controller 1012, processor 1014, or warping engine 1016. Warp maps 1018 may be applied in any suitable location, such as controller 1012, projector 1004, or rendering software stored as executable code 1022 in memory 1020. Controller 1012 may receive sensor data from sensor 1010 and use that sensor data to move projectors 1004 via motor 1024.

Figure 11:
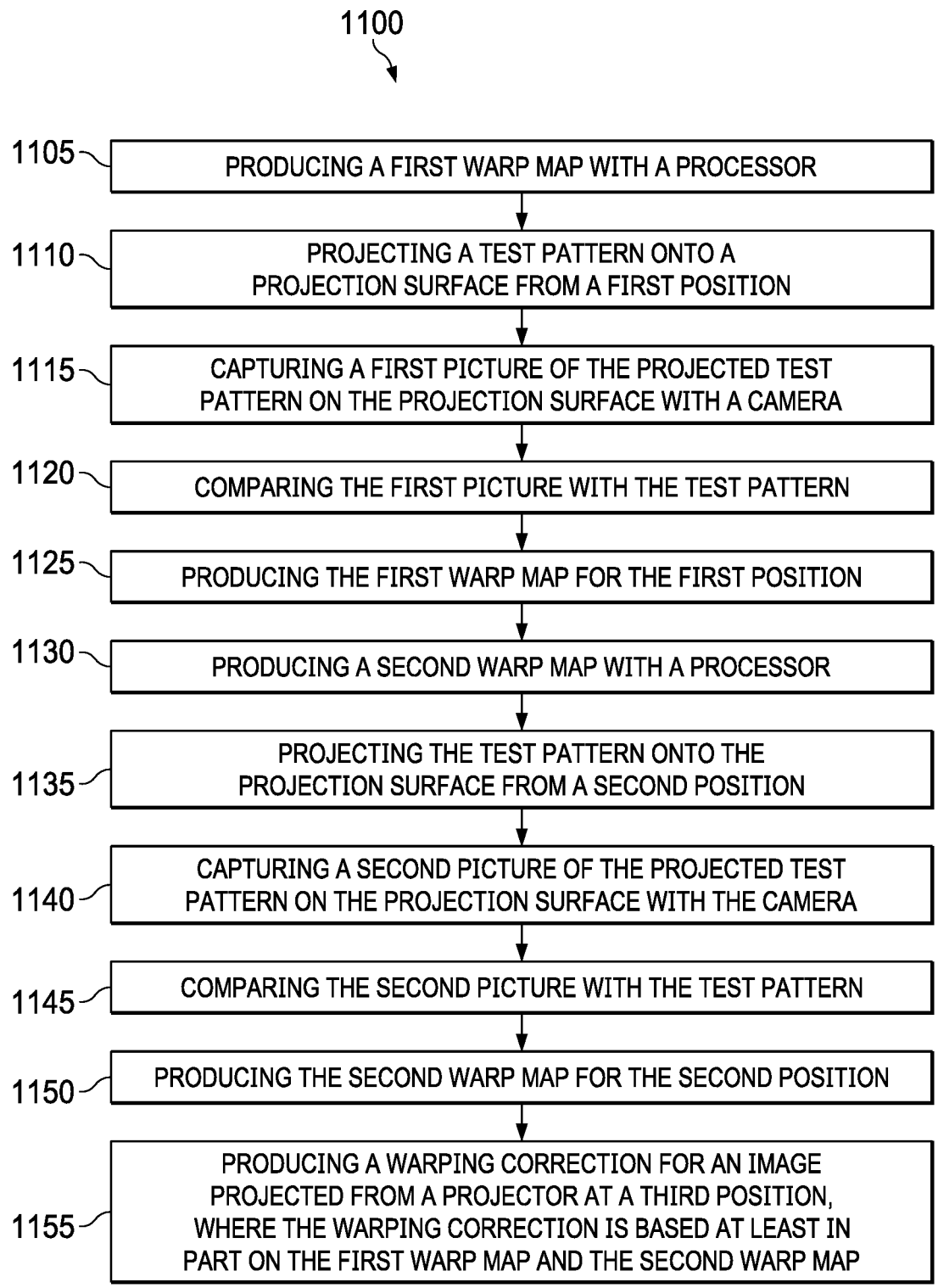
FIG. 11 is a flow diagram of a method for implementing dynamic image warping in accordance with various examples.

FIG. 11 is a flow diagram of a method 1100 for implementing dynamic image warping in accordance with various examples herein. The steps of method 1100 may be performed in any suitable order. The hardware components described above with respect to FIG. 10 may perform method 1100 in one example.

Method 1100 begins at 1105, where a controller 1012 or processor 1014 produces a first warp map. The first warp map is for a projector projecting from a first position, and the first warp map reduces warping based on the first position. Warp maps may be created using any suitable technique. Method 1100 describes one technique for producing a warp map. However, other techniques may be used in other examples.

Steps 1110 to 1125 provide additional details for producing the first warp map. At 1110, a projector projects a test pattern onto a projection surface from the first position. The test pattern may be a chessboard pattern or ArUco markers in some examples, as described with respect to FIG. 3A above. Any other appropriate pattern may be used as well.

At 1115, a camera captures a first picture of the projected test pattern on the projection surface. The picture of the projected test pattern may be stored in any suitable location. At 1120, the controller 1012 or processor 1014 compares the first picture of the projected test pattern on the projection surface with the test pattern. The comparison is used to produce a warp map. By comparing the first picture of the projected test pattern with the test pattern, the controller 1012 or processor 1014 may use the differences between the first picture and the test pattern to determine the amount and type of distortion in the projected test pattern.

At 1125, the controller 1012 or processor 1014 produces the first warp map for the first position. The warp map compensates for the amount and type of distortion present in the projected test pattern so that projected images may be displayed with no or minimal warping. The warp maps may be produced using any suitable technique. In one example, one or more polynomial equations characterize the distortion. In another example, the warp map characterizes the geometric distortion that each pixel undergoes, and applying the warp map pre-displaces the pixels by a specific magnitude in a specific direction and so the resultant image is rectilinear.

At 1130, a controller 1012 or processor 1014 produces a second warp map for a projector projecting from a second position, where the second warp map reduces warping based on the second position. Because the projector moves positions, warp maps are produced herein for multiple different projector positions. If the projector is at a position for which a warp map has been produced, the warp map for that position may be used. If the projector is at a position for which a warp map has not been produced, warping correction may be determined by using warp maps for two nearby positions and performing an interpolation or regression between the two nearby warp maps.

Steps 1135 to 1150 provide additional details for producing the second warp map, and are similar to steps 1110 to 1125 above. At 1135, a projector projects a test pattern onto a projection surface from the second position. The test pattern may be a chessboard pattern or ArUco markers in some examples, as described with respect to FIG. 3A above.

At 1140, a camera captures a second picture of the projected test pattern on the projection surface. The picture of the projected test pattern may be stored in any suitable location. At 1145, the controller 1012 or processor 1014 compares the second picture of the projected test pattern on the projection surface with the test pattern. At 1150, the controller 1012 or processor 1014 produces the second warp map for the second position, similar to step 1130 described above.

Method 1100 proceeds to 1155. At 1155, the controller 1012 or processor 1014 produces a warping correction for an image projected from the projector at a third position, where the warping correction is based at least in part on the first warp map and the second warp map. As described above, if the projector is at a position for which a warp map has not been produced, warping correction may be determined by using warp maps for two nearby positions (such as the first warp map and the second warp map) and performing an interpolation or regression. The discussion of FIG. 7 above describes various methods for interpolating between two warp maps. In one example, if the projector is at a position between the discrete positions for which warp maps exist, linear equations may be used to translate the projector position and an existing warp map(s) into an updated warping correction. The updated warping correction is then applied to the image projected from the projector at the intermediate position.

In an example, the controller may move the projector to a fourth position between the first position and the second position, where the fourth position is different than the third position. Then, the controller would apply warping correction to the image projected from the projector at the fourth position. The warping correction would again be based at least in part on the first warp map and the second warp map. The warping correction applied to the projector in the fourth position is determined by interpolating or performing a regression with the first warp map and the second warp map to determine the updated warping correction to apply based on the projector being in the fourth position. The controller is configured to apply warping correction to the projector at any position by interpolating or performing a regression between two warp maps.

In other examples, the projector may move for reasons other than to provide a 3D viewing effect. The projector may move to avoid shadows on the display screen in one example. In another example, the projector or projectors may be stationary and the display screen may move instead.

As described herein, the projector or projectors move along a predefined path, such as a horizontal rail. Positional feedback regarding the projector's position is used by a controller or processor to produce the appropriate warping correction. Any suitable type of interpolation or regression is useful to produce a warp map when the projector is situated at a position between calibrated warp maps.

Figure 12:
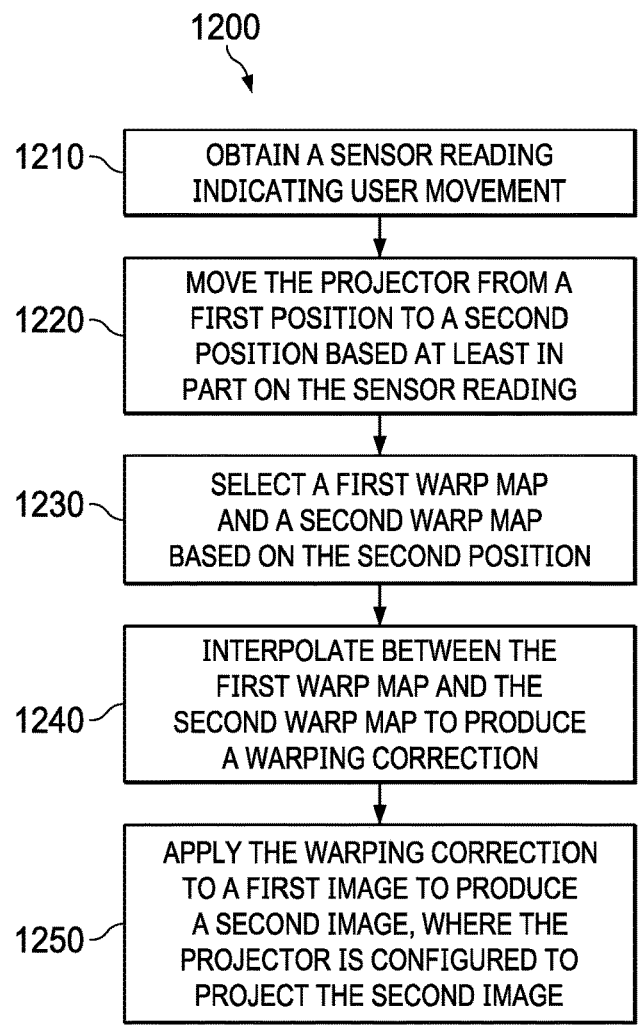
FIG. 12 is a flow diagram of a method for implementing dynamic image warping in accordance with various examples.

FIG. 12 is a flow diagram of a method 1200 for implementing dynamic image warping in accordance with various examples herein. The steps of method 1200 may be performed in any suitable order. The hardware components described above with respect to FIG. 10 may perform method 1200 in one example.

Method 1200 begins at 1210, a controller 1012 or processor 1014 obtains a sensor reading indicating user movement. In one example, a sensor 1010 may track the movement of a user's head or eyes and provide a sensor reading responsive to the user's movement.

Method 1200 continues at 1220, where the controller 1012 or processor 1014 moves the projector from a first position to a second position, based at least in part on the sensor reading. As the user's eyes move, the projector moves in response to continue to provide a properly aligned image to the user. In an example, the projector moves along a rail, and can stop at any position along the rail.

Method 1200 continues at 1230, where the controller 1012 or processor 1014 selects a first warp map and a second warp map based on the second position. Warp maps are created for a number of discrete projector positions. In an example, the projector is located at the second position, and a warp map does not exist for the second position. Therefore, the warp maps are selected from the closest positions with warp maps on either side of the second position. The first warp map may correspond to a position to the left of the second position, and the second warp map may correspond to a position to the right of the second position.

Method 1200 continues at 1240, where the controller 1012 or processor 1014 interpolates between the first warp map and the second warp map to produce a warping correction. Because the first warp map corresponds to a position on one side of the second position, and the second warp map corresponds to a position on the other side of the second position, an interpolation may be performed using the first warp map and the second warp map. The interpolation may be performed using any suitable technique, such as the techniques described above with respect to FIG. 7. The interpolation results in a warping correction that is applied to the projector when the projector is at the second position.

Method 1200 continues at 1250, where the controller 1012 or processor 1014 applies the warping correction to a first image to produce a second image. The projector is configured to project the second image. The first image is the image provided to the projector without warping correction. The second image is the image that is projected to the user after warping correction is applied. The second image is a properly aligned image from the perspective of the user, as a result of the interpolated warping correction.

Examples herein choose and apply the correct warp map, or an interpolation or regression of multiple warp maps, as a function of projector position. The examples herein can compensate for image warping even when the projector or projectors move and stop at any point along a continuous path. In examples herein, a 3D experience is provided to a user without the use of 3D glasses. If the user moves, the projector or projectors also move in response to the user movement, so the user continues to see a properly aligned 3D image even though the user has moved with respect to the display.

In this description, the term "couple" may cover connections, communications, or signal paths that enable a functional relationship consistent with this description. For example, if device A provides a signal to control device B to perform an action, then: (a) in a first example device A is directly coupled to device B; or (b) in a second example device A is indirectly coupled to device B through intervening component C if intervening component C does not substantially alter the functional relationship between device A and device B, so device B is controlled by device A via the control signal provided by device A.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

Unless otherwise stated, "about," "approximately," or "substantially" preceding a value means+/−10 percent of the stated value. Modifications are possible in the described examples, and other examples are possible within the scope of the claims.

What is claimed is:

1. A system, comprising:
a projector; and
a controller coupled to the projector, the controller configured to:
obtain a sensor reading indicating user movement;
move the projector from a first position to a second position based on the sensor reading;
select a first warp map and a second warp map based on the second position;
produce a warping correction based on the first warp map and the second warp map; and
apply the warping correction to a first image to produce a second image; and
wherein the projector is configured to project the second image.

2. The system of claim 1, wherein:
the controller is configured to move the projector from the second position to a third position, based on the sensor reading.

3. The system of claim 2, wherein the controller is configured to apply the warping correction to the first image to produce a third image, where the third image is produced by interpolating between the first warp map and the second warp map, the warping correction based on the third position.

4. The system of claim 1, wherein the controller is configured to perform a linear regression between the first warp map and the second warp map to produce the warping correction.

5. The system of claim 1, wherein the controller is configured to produce the warping correction by interpolating between the first warp map and the second warp map using a lookup table.

6. The system of claim 1, wherein the controller is configured to produce the first warp map for the projector at the first position and to produce the second warp map for the projector at a third position.

7. The system of claim 1, wherein the sensor reading represents an eye location.

8. The system of claim 1, wherein producing the warping correction comprises interpolating between the first warp map and the second warp map.

9. A method, comprising:
producing a first warp map by:
projecting, by a projector at a first position, a test pattern;
capturing, by a camera, a first picture of the projected test pattern;
and
producing, by at least one processor, the first warp map for the projector at a first position based on the first picture and the test pattern;
producing a second warp map by:
projecting, by the projector at a second position, the test pattern;
capturing, by the camera, a second picture of the projected test pattern;
and
producing, by the at least one processor, the second warp map for the projector at the second position based on the second picture and the test pattern; and
producing, by the at least one processor, a warping correction for an image projected from the projector at a third position based on the first warp map and the second warp map.

10. The method of claim 9, wherein the warping correction is based on interpolation between the first warp map and the second warp map.

11. The method of claim 9, wherein the warping correction is based on a linear regression between the first warp map and the second warp map.

12. The method of claim 9, further comprising:
moving the projector to a fourth position between the first position and the second position, the fourth position different than the third position; and
producing the warping correction for the image projected from the projector at the fourth position, wherein the warping correction is based at least in part on the first warp map and the second warp map.

13. The method of claim 12, wherein moving the projector to the fourth position includes moving the projector to the fourth position based on a user movement.

14. The method of claim 9, wherein the warping correction is stored in a lookup table.

15. A system, comprising:
a first projector;
a second projector offset from the first projector;
a rail; and
a controller coupled to the first projector and to the second projector, the controller configured to:
move the first projector and the second projector along the rail;
apply a first warping correction to a first image projected by the first projector, based on a first warp map associated with a first position, a second warp map associated with a second position, and a third position of the first projector; and
apply a second warping correction to a second image projected by the second projector, based on a fourth position of the second projector.

16. The system of claim 15, wherein the controller is configured to create the first warping correction by interpolating between two stored warp maps.

17. The system of claim 15, wherein the controller is configured to create the first warping correction by performing a linear regression between two stored warp maps.

18. The system of claim 15, wherein the first projector and the second projector are offset horizontally.

19. The system of claim 15, wherein the rail is approximately parallel to a projection screen.

20. The system of claim 15, further comprising:
a memory configured to store one or more warp maps, wherein the warp maps that are stored correspond to discrete projector positions along the rail.

21. The system of claim 15, further comprising:
a sensor configured to determine a user movement, wherein the controller is configured to move the first projector and the second projector along the rail based at least in part on the user movement.

* * * * *